(12) United States Patent
Hayakawa

(10) Patent No.: US 8,514,495 B2
(45) Date of Patent: Aug. 20, 2013

(54) ZOOM LENS SYSTEM

(75) Inventor: Koichiro Hayakawa, Saitama (JP)

(73) Assignee: Hoya Corporation, Tokyo (JP)

( * ) Notice: Subject to any disclaimer, the term of this patent is extended or adjusted under 35 U.S.C. 154(b) by 111 days.

(21) Appl. No.: 13/310,189

(22) Filed: Dec. 2, 2011

(65) Prior Publication Data

US 2012/0147479 A1    Jun. 14, 2012

(30) Foreign Application Priority Data

Dec. 8, 2010 (JP) ................................ 2010-273448

(51) Int. Cl.
*G02B 15/14* (2006.01)
*G02B 9/12* (2006.01)

(52) U.S. Cl.
USPC ............................ 359/678; 359/682; 359/689

(58) Field of Classification Search
CPC ....... G02B 15/14; G02B 15/16; G02B 15/177
USPC ................ 359/676, 678, 680–682, 686, 689
See application file for complete search history.

(56) References Cited

U.S. PATENT DOCUMENTS

| | | | | |
|---|---|---|---|---|
| 5,920,427 A * | 7/1999 | Ogata | ............................ | 359/432 |
| 6,865,032 B2 * | 3/2005 | Hankawa et al. | ............. | 359/754 |
| 2006/0092524 A1 | 5/2006 | Konno | | |

FOREIGN PATENT DOCUMENTS

JP    2006-154702    6/2006

OTHER PUBLICATIONS

U.S. Appl. No. 12/036,459 to Hiroshi Nomura et al., filed Feb. 25, 2008.

* cited by examiner

*Primary Examiner* — Darryl J Collins
(74) *Attorney, Agent, or Firm* — Greenblum & Bernstein P.L.C.

(57) ABSTRACT

A zoom lens system includes a negative first lens group, a positive second lens group, and a positive third lens group, in that order from the object side, wherein upon zooming from the short focal length extremity to the long focal length extremity, the distance between the first lens group and the second lens group is decreased, and the distance between the second lens group and the third lens group is decreased. A reflection prism having a negative refractive power is provided between the third lens group and the imaging plane, and wherein the following condition (1) is satisfied:

$$P2vd < 32 \qquad (1),$$

wherein
  P2vd designates the Abbe number with respect to the d-line of the reflection prism, which is provided between the third lens group and the imaging plane.

7 Claims, 32 Drawing Sheets

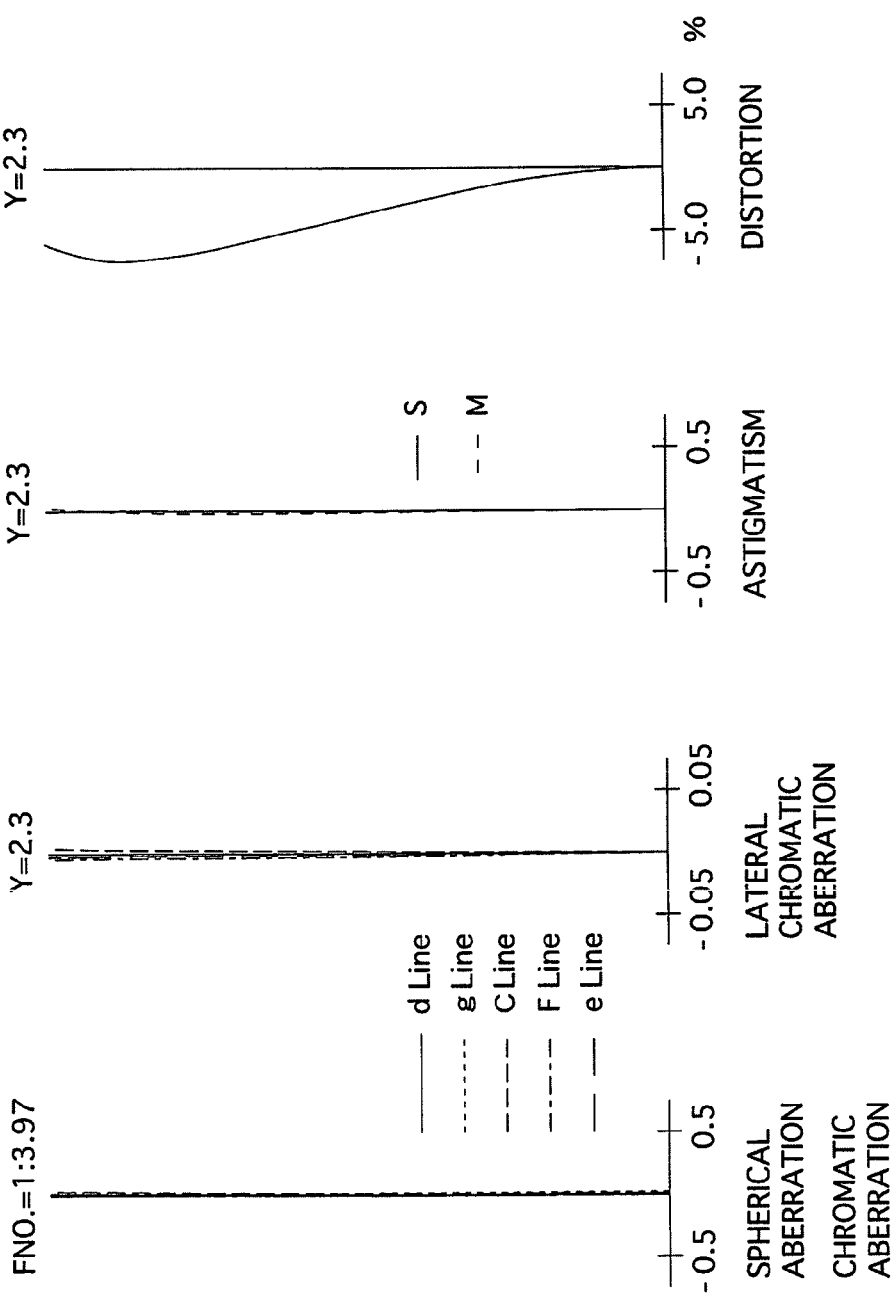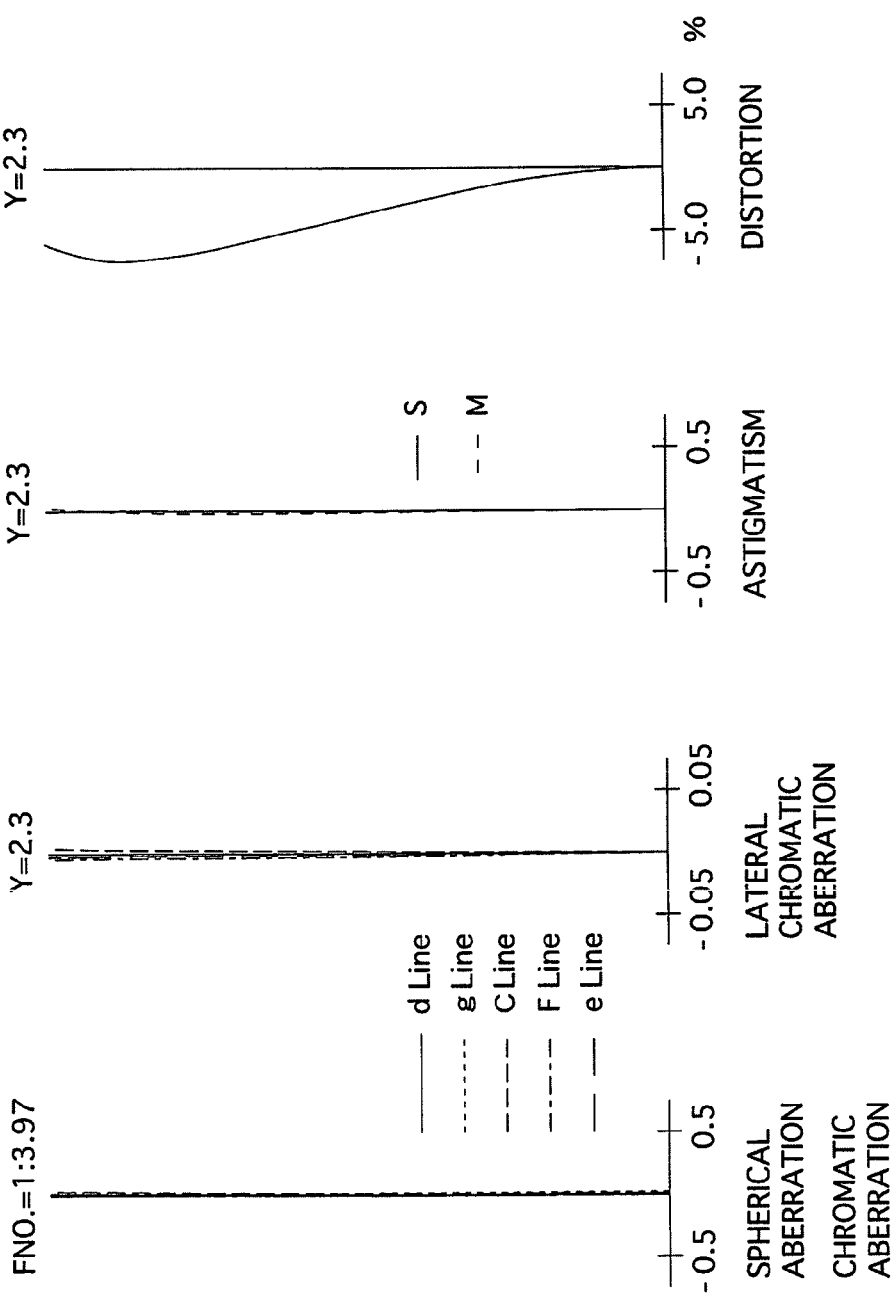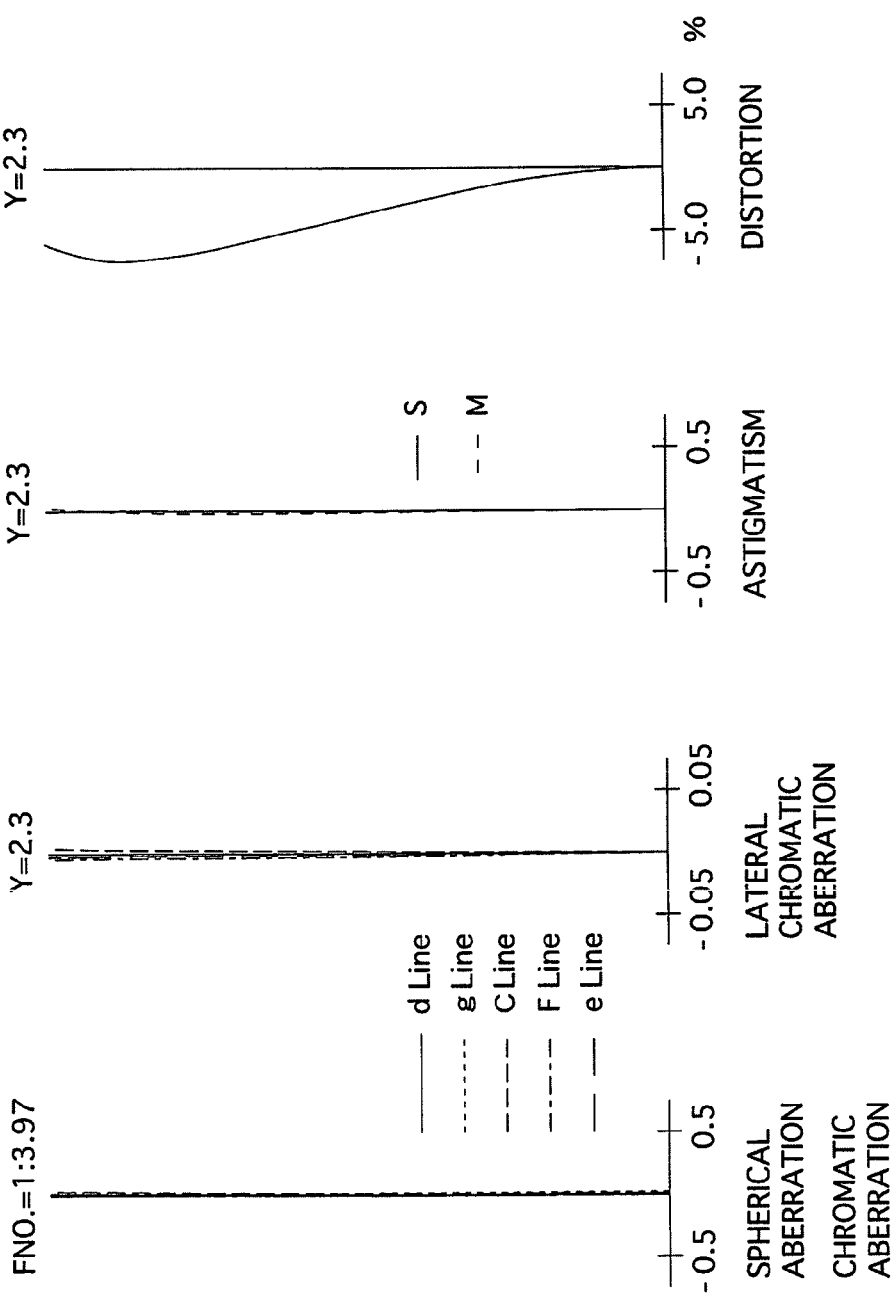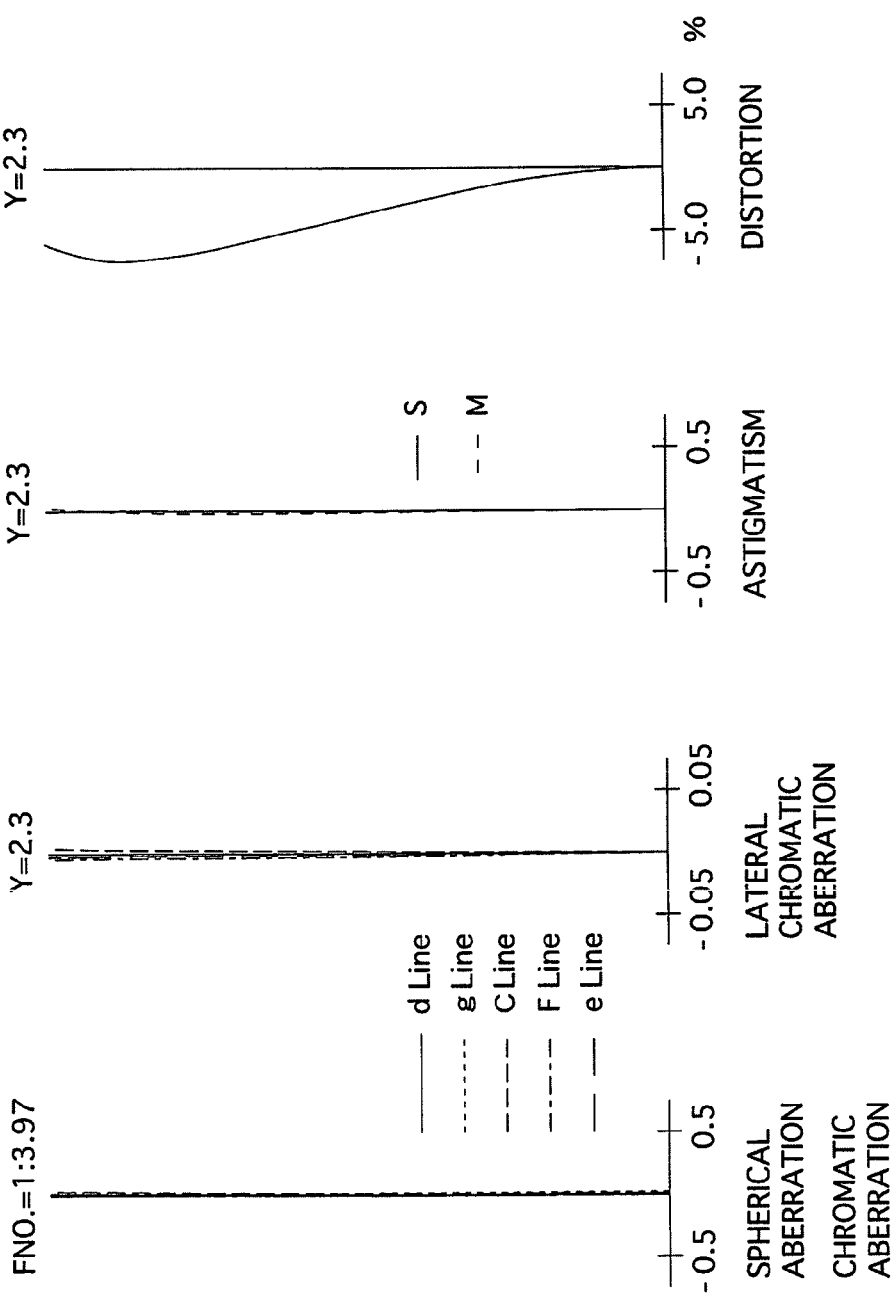

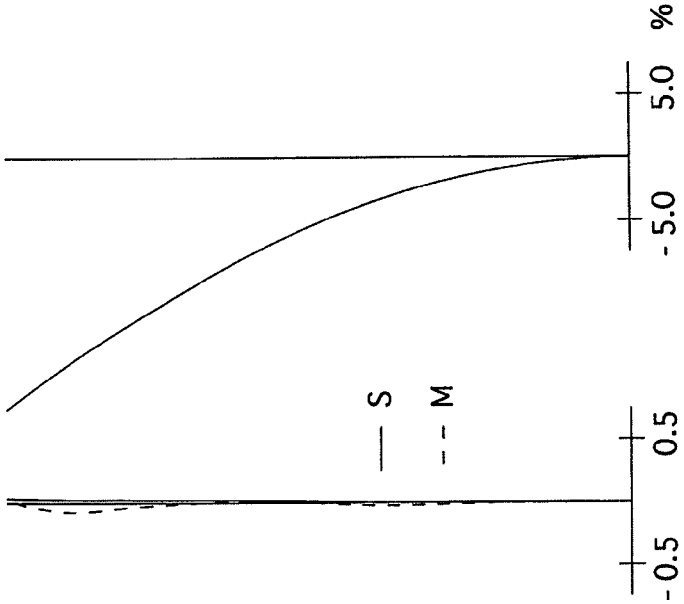
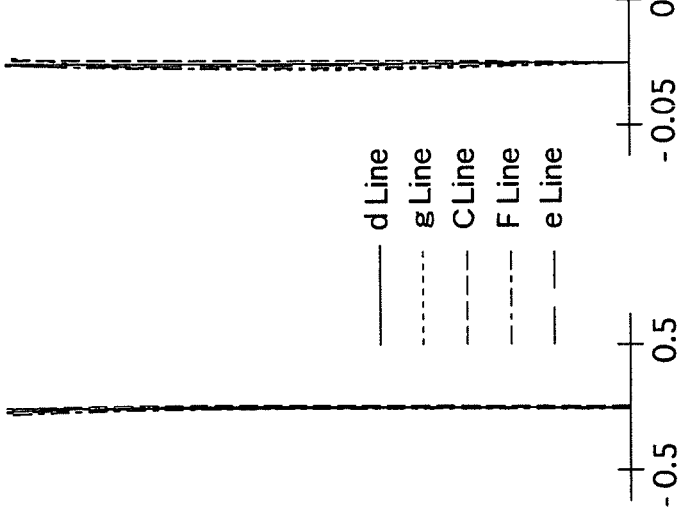
Fig. 30A  Fig. 30B  Fig. 30C  Fig. 30D

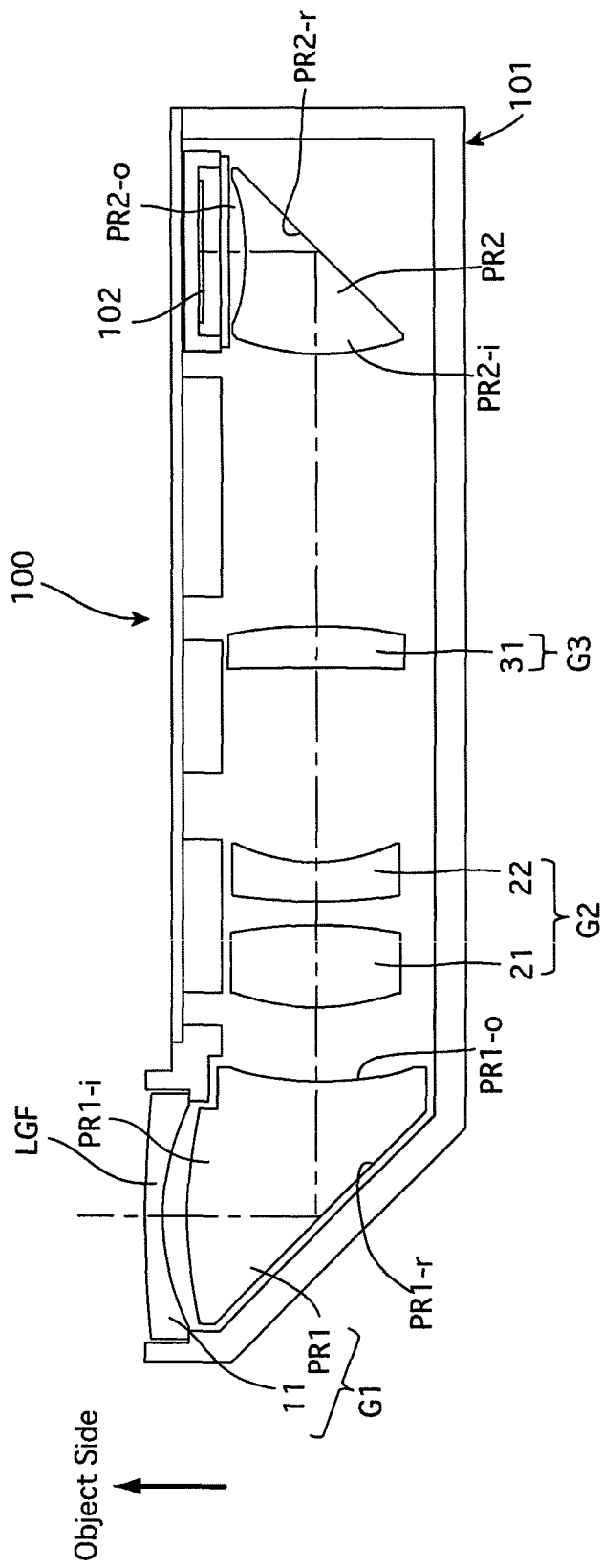

ZOOM LENS SYSTEM

BACKGROUND OF THE INVENTION

1. Field of the Invention

The present invention relates to a so-called bending zoom lens system.

2. Description of Related Art

In recent years, there has been a strong demand for digital cameras to be further miniaturized (especially in regard to a slimmer body design). A bending optical system which is provided with reflective members such as prisms or reflection mirrors that bend the optical path within the lens system is known in art as arrangement that can achieve a slimmer body design. For example, in Japanese unexamined patent application No. 2006-154702, a zoom lens system is disclosed which achieves a reduction in the number of lens elements and a reduction in the overall length of the zoom lens system (a slimmer body design) by providing reflection prisms, each having a refractive power, at the object side and at the image side of the zoom lens system, respectively, in which each of the reflection prisms shares the optical function of an optical lens element.

In order to achieve miniaturization of the zoom lens system, it is essential to reduce the overall length of the zoom lens system. However, if attempts are made to increase the zoom ratio by extending the focal length at the long focal length extremity toward the telephoto side in order to achieve a higher zoom ratio, miniaturization of the zoom lens system becomes difficult since the overall length of the zoom lens system increases. Accordingly, in order to achieve a compact zoom lens system having a high zoom ratio, it is desirable to reduce the focal length at the short focal length extremity so as to attain a wider angle-of-view.

In the zoom lens system disclosed in the above-mentioned Japanese unexamined patent application No. 2006-154702, a low-dispersion material is used for a reflection prism provided at the image side in order to reduce chromatic aberration (by suppressing the amount of chromatic aberration that occurs at the reflection prism itself); however, in such an arrangement, if the focal length is reduced and the angle-of-view widened at the short focal length extremity, the canceling-out effect of the image side reflection prism, by correcting lateral chromatic aberration that occurs at the lens group at the object side, is reduced. Furthermore, since the first lens group is configured only of a single (another) reflection prism having a refractive power, the lateral chromatic aberration in the case where the focal length is reduced and a wider angle-of-view is attained cannot be sufficiently corrected, so that it is difficult to achieve a high zoom ratio considering the balance of the aberrations. In fact, the zoom lens system of Japanese unexamined patent application No. 2006-154702 only has a zoom ratio of approximately 2:1, which cannot be said to satisfy the high-specification needs of the market.

SUMMARY OF THE INVENTION

The present invention provides a compact zoom lens system having a high optical quality, a zoom ratio of approximately 2.8:1 through 3.0:1, and can achieve a wide angle-of-view.

According to an aspect of the present invention, a zoom lens system is provided, including a negative first lens group, a positive second lens group, and a positive third lens group, in that order from the object side, wherein upon zooming from the short focal length extremity to the long focal length extremity, the distance between the first lens group and the second lens group is decreased, and the distance between the second lens group and the third lens group is decreased. A reflection prism having a negative refractive power is provided between the third lens group and the imaging plane, and wherein the following condition (1) is satisfied:

$$P2vd < 32 \quad (1),$$

wherein P2vd designates the Abbe number with respect to the d-line of the reflection prism provided between the third lens group and the imaging plane.

It is desirable for the reflection prism that is provided between the third lens group and the imaging plane to include a convex surface on the object side (incident surface) and a concave surface on the image side (exit surface), wherein the following conditions (2) and (3) are satisfied:

$$2.5 < P2R1/fw < 6.8 \quad (2), \text{ and}$$

$$2.0 < P2R2/fw < 4.3 \quad (3),$$

wherein P2R1 designates the radius of curvature of the surface on the object side (incident surface) of the reflection prism that is provided between the third lens group and the imaging plane, P2R2 designates the radius of curvature of the surface on the image side (exit surface) of the reflection prism that is provided between the third lens group and the imaging plane, and fw designates the focal length of the entire zoom lens system at the short focal length extremity.

It is desirable for the first lens group to include a negative lens element, and a reflection prism having a positive refractive power and a convex surface on the object side (incident surface) thereof, in that order from the object side.

It is desirable for the following condition (4) to be satisfied:

$$P1vd < 28 \quad (4),$$

wherein P1vd designates the Abbe number with respect to the d-line of the reflection prism that is provided within the first lens group.

It is desirable for the following condition (5) to be satisfied:

$$1.1 < ft/f2 < 1.5 \quad (5),$$

wherein ft designates the focal length of the entire the zoom lens system at the long focal length extremity, and f2 designates the focal length of the second lens group.

It is desirable for the reflection prism that is provided between the third lens group and the imaging plane to include an aspherical surface on at least one of the object side (incident surface) and the image side (exit surface) thereof.

It is desirable for the reflection prism that is provided within the first lens group to include an aspherical surface on at least one of the object side (incident surface) and the image side (exit surface) thereof.

According to the present invention, a compact zoom lens system having a high optical quality, a zoom ratio of approximately 2.8:1 through 3.0:1, and a wide angle-of-view is achieved.

The present disclosure relates to subject matter contained in Japanese Patent Application No. 2010-273448 (filed on Dec. 8, 2010) which is expressly incorporated herein in its entirety.

BRIEF DESCRIPTION OF THE DRAWINGS

The present invention will be discussed below in detail with reference to the accompanying drawings, in which:

FIGS. 22A, 22B, 22C and 22D show various aberrations that occurred in the lens arrangement shown in FIG. 21;

FIGS. 30A, 30B, 30C and 30D show various aberrations that occurred in the lens arrangement shown in FIG. 29;

FIG. 32 is a conceptual drawing showing the zoom lens system of the present invention applied to (assembled into) an imaging unit.

DESCRIPTION OF THE EMBODIMENTS

Figure 31:
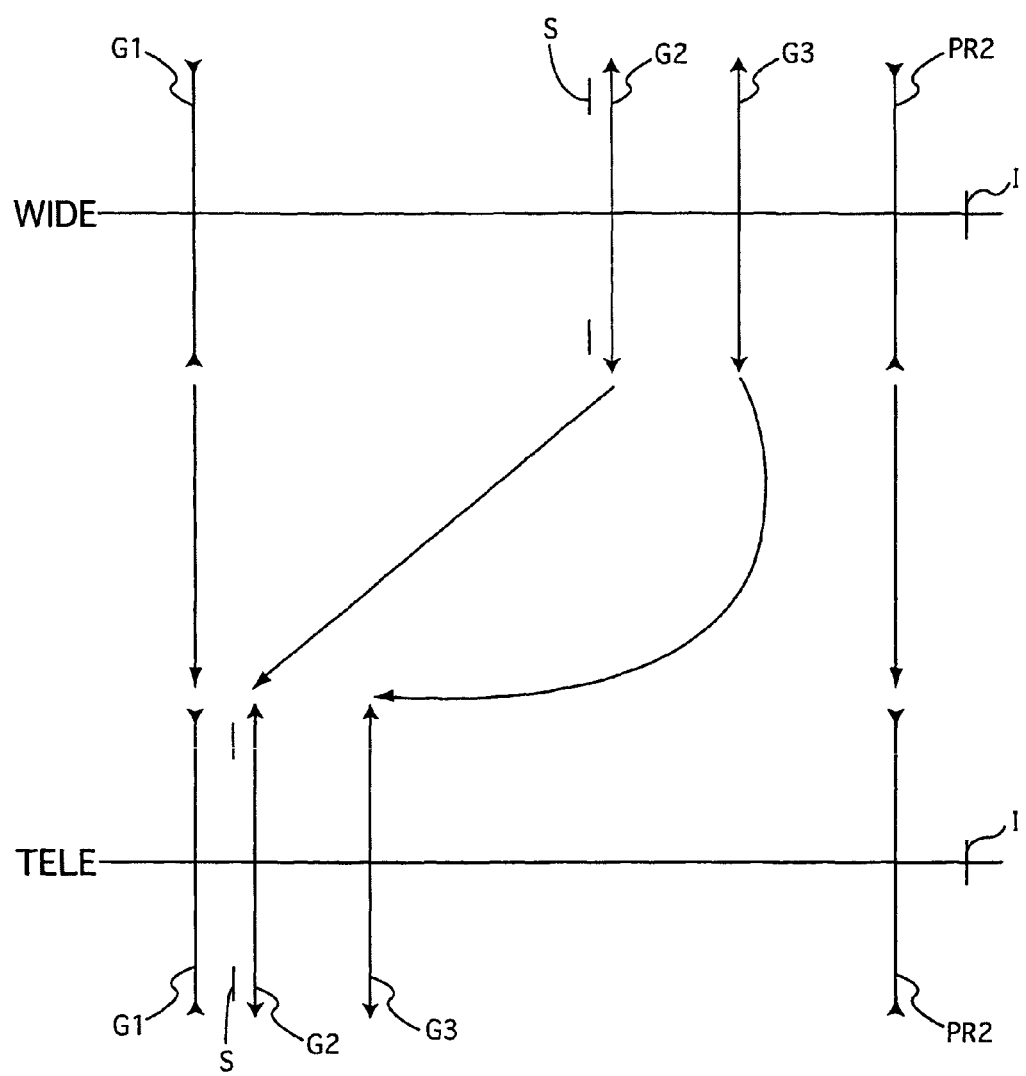
FIG. 31 shows a zoom path of the zoom lens system according to the present invention.

The zoom lens system according to the present invention, as shown in the zoom path of FIG. 31, is configured of a negative first lens group G1, a positive second lens group G2, a positive third lens group G3 and a reflection prism PR2 having a negative refractive power, in that order from the object side. A diaphragm S, which is positioned in a plane that is orthogonal to the optical axis and is tangent to the object-side surface of the second lens group G2 (the diaphragm S is shown slightly in front of the second lens group G2 on the object side in FIG. 32) moves integrally with the second lens group G2 during zooming. 'I' designates the imaging plane. The third lens group G3 constitutes a focusing lens group which is moved during a focusing operation (the third lens group G3 is advanced toward the image side upon carrying out a focusing operation on an object at infinity to an object at a finite distance).

The zoom lens system, upon zooming from the short focal length extremity (WIDE) to the long focal length extremity (TELE), moves the second and third lens groups G2 and G3 in the optical axis direction so that the distance between the first lens group G1 and second lens group G2 is reduced, the distance between the second lens group G2 and the third lens group G3 is reduced, and the distance between the third lens group G3 and the reflection prism PR2 is increased.

More specifically, as shown in the zoom path of FIG. 31, in each of the first through fifth numerical embodiments, upon zooming from the short focal length extremity to the long focal length extremity, the first lens group G1 remains stationary with respect to the optical axis direction (distance from the imaging plane I), the second lens group G2 moves monotonically toward to the object side, the third lens group G3 first moves toward the image side and thereafter moves toward the object side so as to be positioned toward the object side overall, and the reflection prism PR2 remains stationary with respect to the optical axis direction (distance from the imaging plane I).

In each of the first through fifth numerical embodiments, the first lens group G1 is configured of a biconcave negative lens element 11, and a reflection prism PR1 having a positive refractive power, in that order from the object side. The reflection prism PR1 is provided with a convex surface on the object side (incident surface), and a concave surface on the image side (exit surface). In each of the first through third and fifth numerical embodiments, the reflection prism PR1 is provided with an aspherical surface on each of the object side (incident surface) and the image side (exit surface). In the fourth numerical embodiment, the reflection prism PR1 is provided with a spherical surface (rather than an aspherical surface) on each of the object side (incident surface) and the image side (exit surface).

In each of the first through fifth numerical embodiments, the second lens group G2 is configured of a positive biconvex lens element 21 and a negative meniscus lens element 22 having a convex surface on the object side, in that order from the object side. The positive biconvex lens element 21 has an aspherical surface on each side thereof.

In each of the first through fifth numerical embodiments, the third lens group G3 is configured of a single positive lens element 31 having a convex surface on the image side. The positive lens element 31 has an aspherical surface on each side thereof.

In each of the first through fifth numerical embodiments, the negative-powered reflection prism PR2 is provided with a convex surface on the object side (incident surface) and a concave surface on the image side (exit surface). In each of the first, second and fifth numerical embodiments, the reflection prism PR2 is provided with a spherical surface (rather than an aspherical surface) on each of the object side (incident surface) and the image side (exit surface). In each of the third and fourth numerical embodiments, the reflection prism PR2 is provided with an aspherical surface on each of the object side (incident surface) and the image side (exit surface).

FIG. 32 shows an imaging unit 100 in which the zoom lens system according to an embodiment of the present invention is installed. The imaging unit 100 is configured such that the first lens group G1, the second lens group G2, the third lens group G3 and the reflection prism PR2, which constitute an imaging optical system, is supported in a housing 101. The first lens group G1 and the reflection prism PR2 are fixed into the housing 101. The second and third lens groups G2 and G3 are supported in the housing 101 so as to be movable therein along the optical axis direction and to constitute a zooming optical system.

The reflection prism PR1 reflects an incident light bundle, which is incident onto an incident surface PR1-$i$, at a reflection surface PR1-$r$ by a substantially right-angle (90 degrees) so that the reflected light exits from an exit surface PR1-$o$. The reflection prism PR2 reflects incident light, which is incident onto an incident surface PR2-$i$, by a reflection surface PR2-$r$ at a substantially right-angle (90 degrees) so as to exit from an exit surface PR2-$o$ and be incident onto an imaging sensor 102. Accordingly, the zoom lens system according to the embodiment of the present invention is a bending optical system that achieves a slimmer body design of the imaging unit 100 by bending the optical path thereof by providing the reflection prism PR1 at the incident side that faces the photographic object and providing the reflection prism PR2 at the exit side that faces the imaging sensor 102.

Furthermore, in the zoom lens system according to the embodiment of the present invention, the reflection prism PR2 having a negative refractive power is provided in between the third lens group G3 and the imaging plane I. By providing an optical lens function on the negative-powered reflection prism PR2 and utilizing the reflection prism PR2 for correction of aberrations, a compact and high-quality zoom lens system can be achieved in which the number of lens elements can be reduced, enabling aberration correction to be performed with a limited number of lens elements, and in which a wider angle-of-view can be attained. Furthermore, the overall length of the zoom lens system can be reduced by having the rear principal point positioned at the object side at the long focal length extremity via the optical function of the negative-powered reflection prism PR2.

Condition (1) specifies the Abbe number with respect to the d-line of the negative-powered reflection prism PR2 positioned between the third lens group G3 and the imaging plane I. By satisfying condition (1), chromatic aberrations can be favorably corrected, especially at the short focal length extremity. Namely, using the reflection prism PR2 which has a high dispersion satisfying condition (1) facilitates the canceling of chromatic aberration that occurs at the third lens group G3, so that the fluctuation of chromatic aberration during zooming can be reduced.

If the upper limit of condition (1) is exceeded, chromatic aberrations cannot be favorably corrected, especially at the short focal length extremity.

As described above, the negative-powered reflection prism PR2 has a convex surface on the object side (incident surface). Therefore, it is possible to favorably converge diverging light that strongly diverges from the third lens group G3 and is made incident onto the reflection prism PR2.

Condition (2) specifies the ratio of the radius of curvature of the object-side surface (incident surface) of the reflection prism PR2 to the focal length of the entire zoom lens system at the short focal length extremity, when the above-described lens arrangement is utilized. By satisfying condition (2), telecentricity and favorable correction of chromatic aberration can both be achieved.

If the upper limit of condition (2) is exceeded, the refractive power of the object-side surface of the reflection prism PR2 becomes too weak so that this refractive power for converging the diverging light that exits from the rearmost surface of the third lens group G3 weakens, and hence, the telecentricity of the zoom lens system deteriorates.

If the lower limit of condition (2) is exceeded, the refractive power of the object-side surface of the reflection prism PR2 becomes too strong, so that since the overall negative refractive power of the reflection prism PR2 weakens, it becomes difficult to correct lateral chromatic aberrations at the short focal length extremity.

As described above, the negative powered reflection prism PR2 has a concave surface on the image-side surface (exit surface) thereof.

Condition (3) specifies the ratio of the radius of curvature of the image-side surface (exit surface) of the reflection prism PR2 to the focal length of the entire zoom lens system at the short focal length extremity, when the above-described lens arrangement is utilized. By satisfying condition (3), a compact zoom lens system and favorable chromatic aberration correction can both be achieved.

If the upper limit of condition (3) is exceeded, the total refractive power of the reflection prism PR2 becomes too weak, so that it becomes difficult to correct lateral chromatic aberration, especially at the short focal length extremity. Furthermore, since the rear principal point is moved to the image side, this is also disadvantageous for achieving a compact (miniaturized) zoom lens system.

If the lower limit of condition (3) is exceeded, the refractive power of the image-side surface (exit surface) of the reflection prism PR2 that has a higher light-ray height than that of the object-side surface (incident surface) thereof becomes too strong, so that it becomes difficult to correct abaxial aberrations.

It is desirable to satisfy both conditions (2) and (3) in order to favorably correct lateral chromatic aberration and abaxial chromatic aberration so as to maintain a superior optical quality, and also in order to attain favorable telecentricity and compactness (miniaturization) of the zoom lens system.

As described above, the first lens group G1 is configured of the negative lens element 11, and the positive-powered reflection prism PR1 that has a convex surface on the object side (incident surface), in that order from the object side. According to this configuration of the first lens group G1, it is possible to utilize the reflection prism PR1 for correcting aberrations also within the first lens group G1, and the number of lens elements can be reduced more significantly.

Condition (4), using the above-described configuration, specifies the Abbe number with respect to the d-line of the reflection prism PR1 provided within the first lens group G1. By satisfying condition (4), chromatic aberration can be favorably corrected over the entire zooming range. Namely, by utilizing a reflection prism (PR1) having a high dispersion that satisfies condition (4), chromatic aberration that occurs at the negative lens element 11 is cancelled out within the first lens group G1 by the reflection prism PR1, so that fluctuation of chromatic aberration during zooming can be reduced.

If the upper limit of condition (4) is exceeded, lateral chromatic aberration at the short focal length extremity and axial chromatic aberration at the long focal length extremity cannot be sufficiently corrected, which is undesirable.

Condition (5) specifies the ratio of the focal length of the entire zoom lens system at the long focal length extremity to the focal length of the second lens group G2. By satisfying condition (5), miniaturization of the zoom lens system (so as to enable a slimmer camera body design) and a high optical quality can both be achieved.

If the upper limit of condition (5) is exceeded, the refractive power of the second lens group G2 becomes too strong, which is disadvantageous in regard to achieving a high optical quality since it becomes difficult to correct aberrations.

If the lower limit of condition (5) is exceeded, the refractive power of the second lens group G2 becomes too weak, so that it becomes difficult to achieve a high zoom ratio, and also the amount of movement of the second lens group G2 along the optical axis direction increases during zooming from the short focal length extremity to the long focal length extremity, which is disadvantageous in regard to achieving miniaturization (a slimmer camera body design).

Specific numerical embodiments will be herein discussed. The following numerical embodiments are applied to a zoom lens system used in a digital camera. In the aberration diagrams and the tables, the d-line, g-line, C-line, F-line and e-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
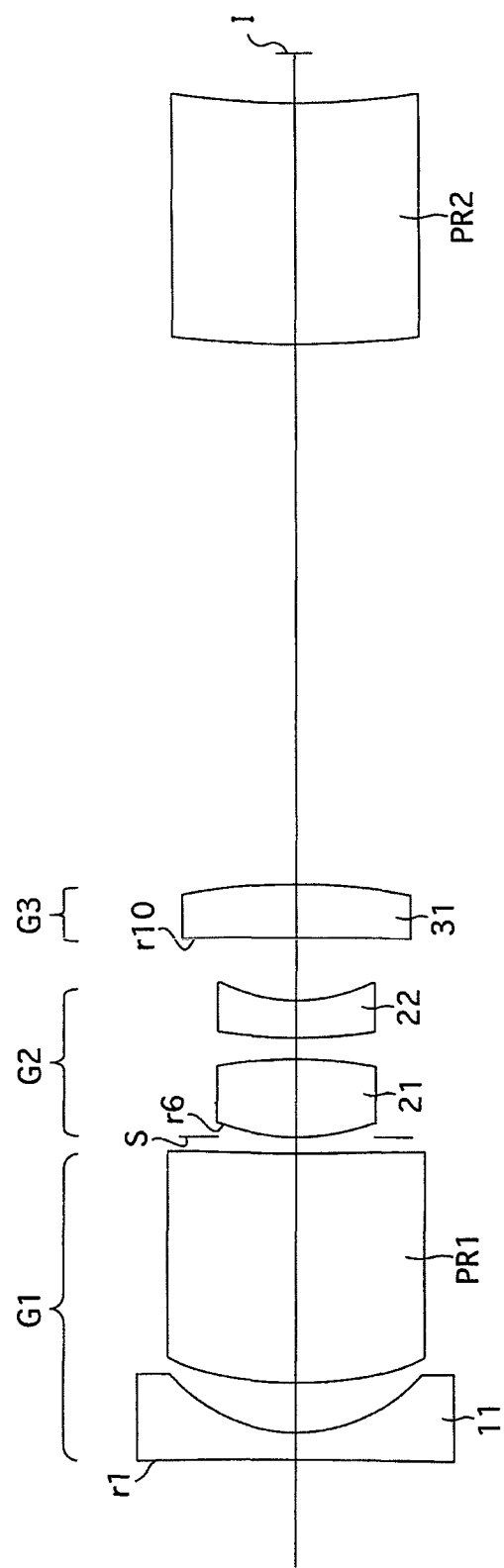
FIG. 1 shows a lens arrangement of a first numerical embodiment of a zoom lens system, according to the present invention, at the long focal length extremity when focused on an object at infinity.
Figure 2:
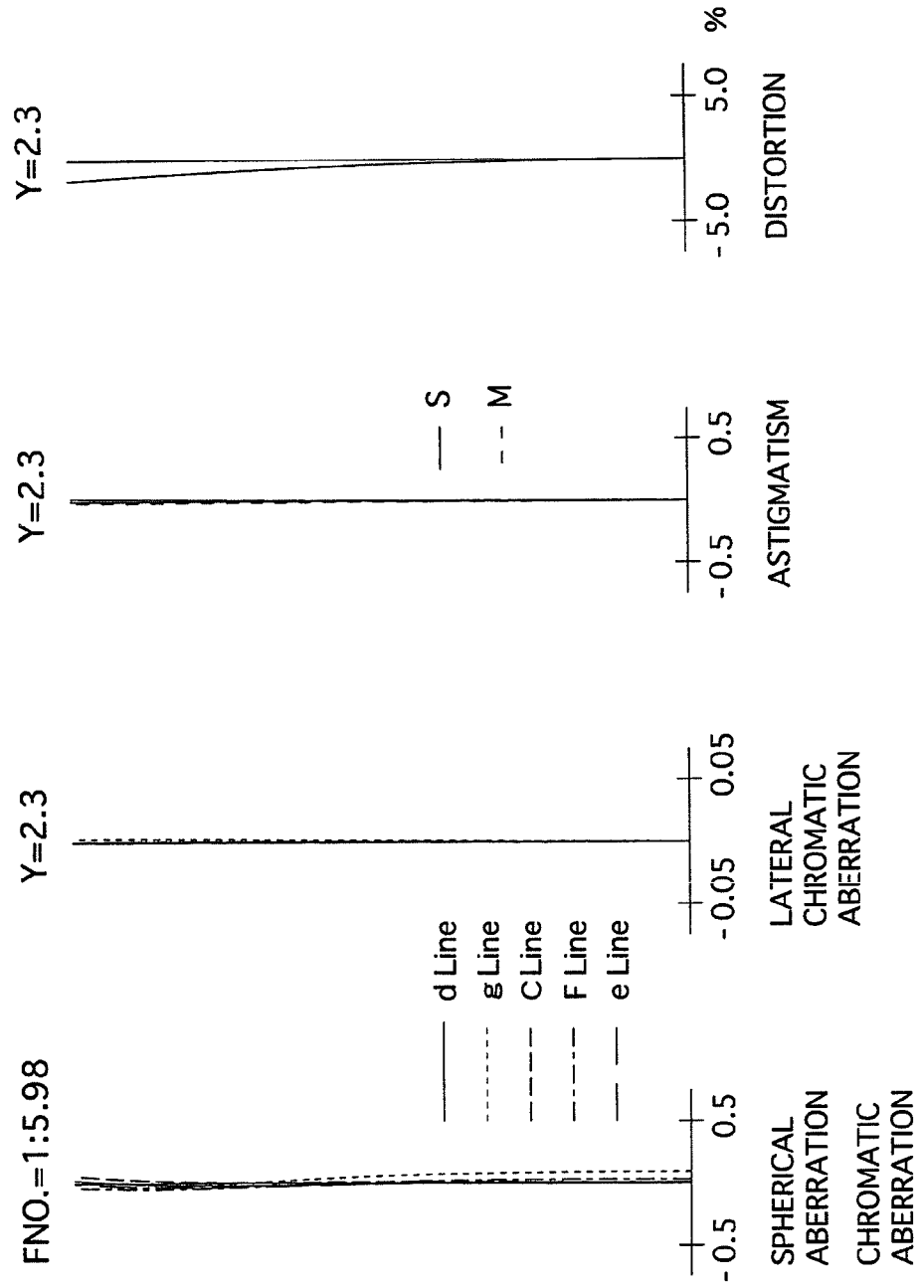
FIGS. 2A, 2B, 2C and 2D show various aberrations that occurred in the lens arrangement shown in FIG. 1.
Figure 3:
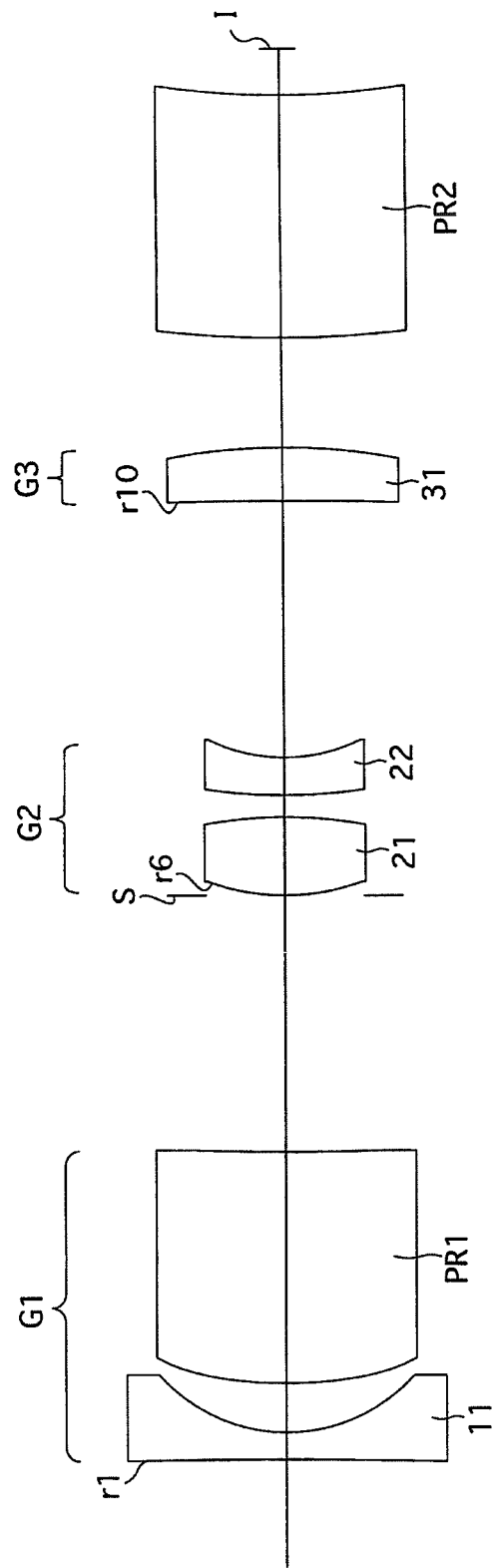
FIG. 3 shows a lens arrangement of the first numerical embodiment of the zoom lens system, according to the present invention, at an intermediate focal length when focused on an object at infinity.
Figure 4:
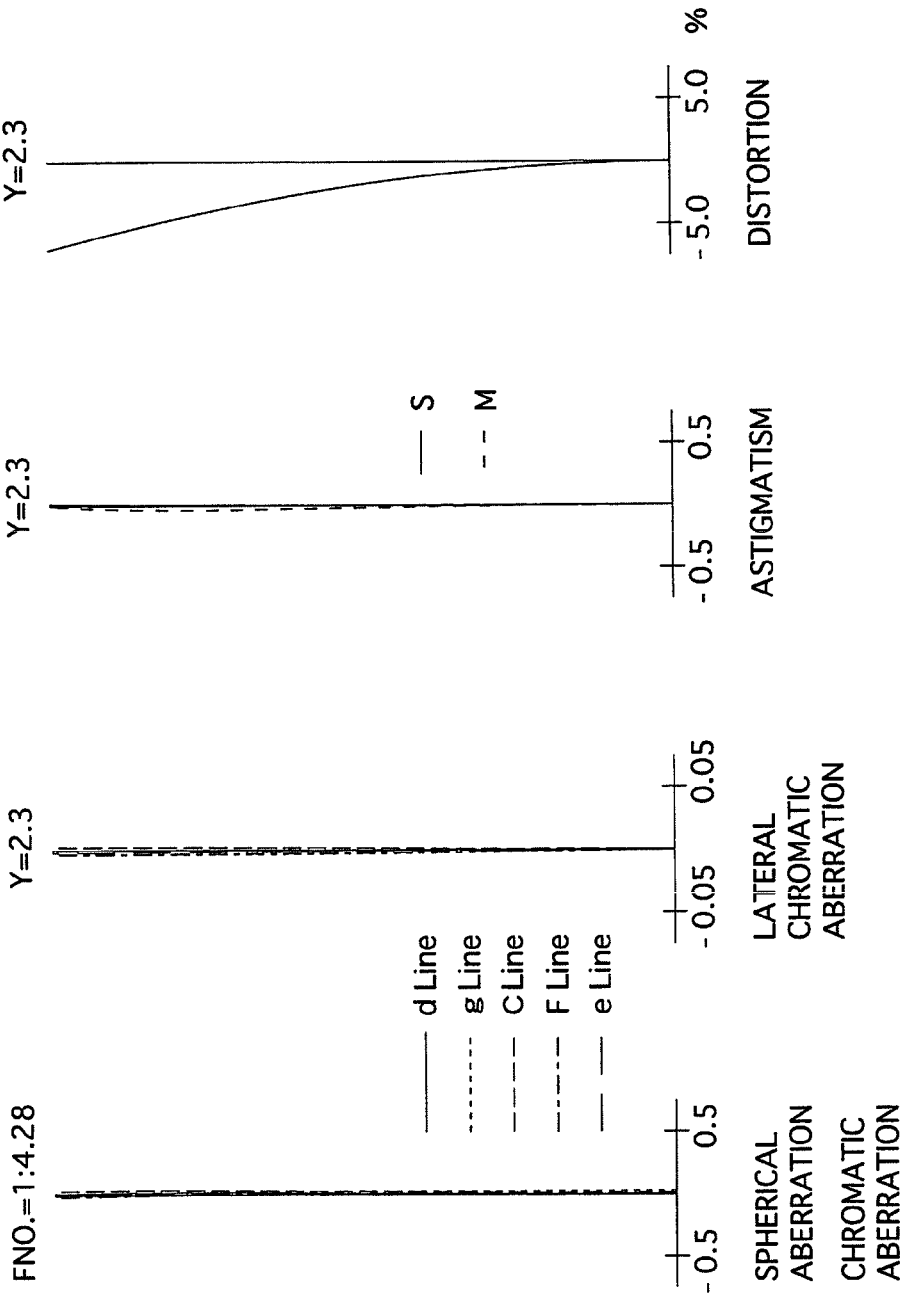
FIGS. 4A, 4B, 4C and 4D show various aberrations that occurred in the lens arrangement shown in FIG. 3.
Figure 5:
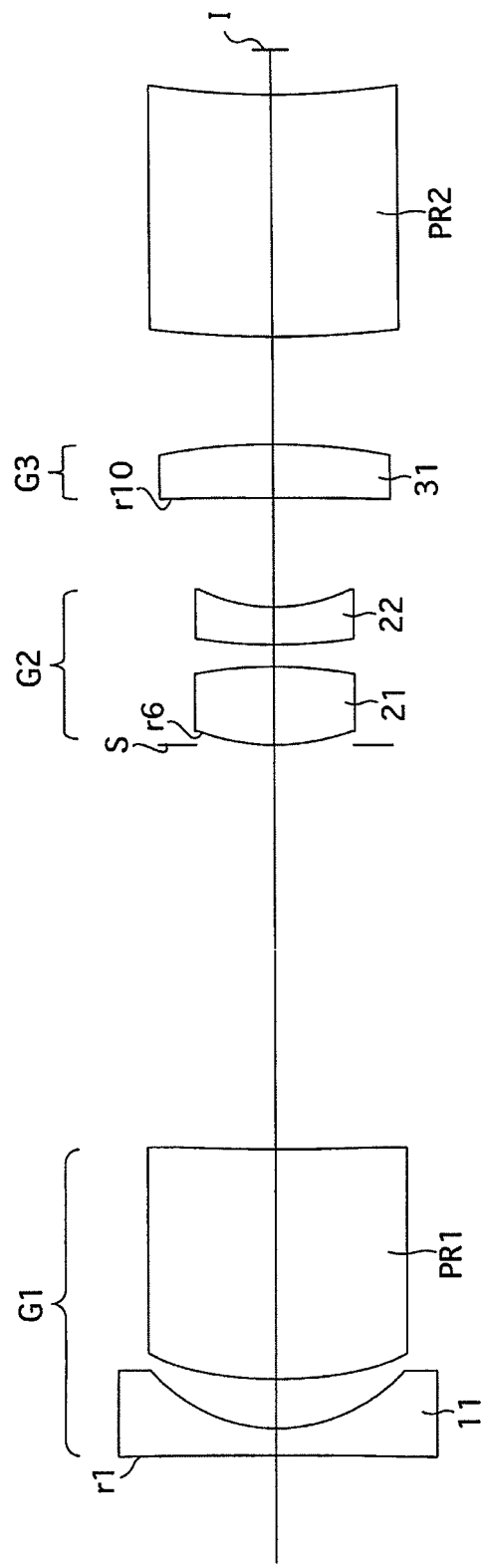
FIG. 5 shows a lens arrangement of the first numerical embodiment of the zoom lens system, according to the present invention, at the short focal length extremity when focused on an object at infinity.
Figure 6:
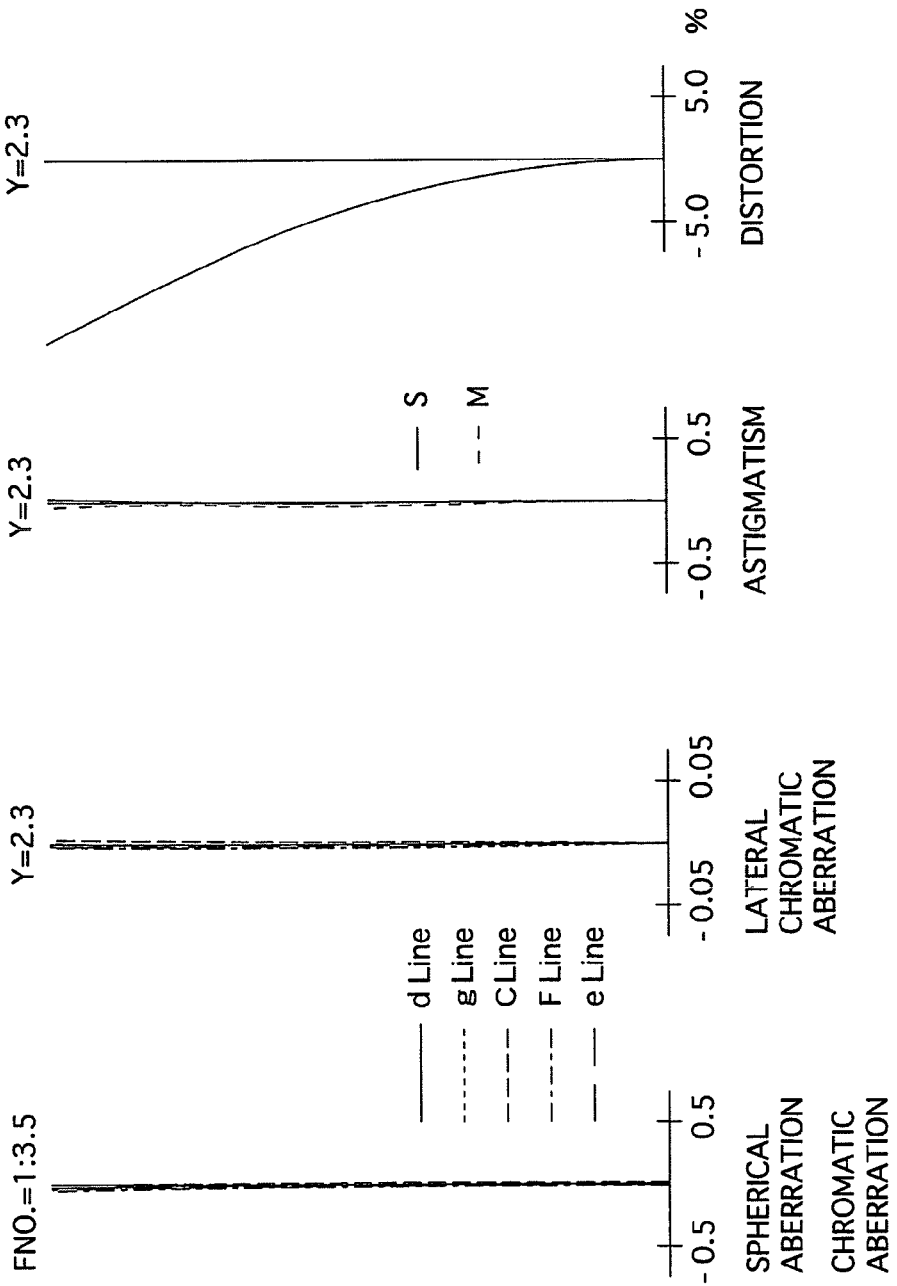
FIGS. 6A, 6B, 6C and 6D show various aberrations that occurred in the lens arrangement shown in FIG. 5.

FIGS. 1 through 6D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the zoom lens system at an intermediate focal length when focussed on an object at infinity. FIGS. 4A, 4B, 4C and 4D show various aberrations that occurred in the lens arrangement shown in FIG. 3. FIG. 5 shows a lens arrangement of the first numerical embodiment of the zoom lens system at the short focal length extremity when focussed on an object at infinity. FIGS. 6A, 6B, 6C and 6D show various aberrations that occurred in the lens arrangement shown in FIG. 5. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2, a positive third lens group G3, and a negative reflection prism PR2, in that order from the object side. The third lens group G3 constitutes a focusing lens group that is moved along the optical axis direction during a focusing operation (the third lens group G3 advances toward the image side when performing a focusing operation while focusing on an object at infinity to an object at a finite distance).

The first lens group G1 (surface Nos. 1 through 4) is configured of a biconcave negative lens element 11 and a positive reflection prism PR1, in that order from the object side. The reflection prism PR1 has a convex surface on the object side (incident surface) and a concave surface on the image side (exit surface). The reflection prism PR1 is provided with an aspherical surface on each of the object side (incident surface) and the image side (exit surface).

The second lens group G2 (surface Nos. 6 through 9) is configured of a positive biconvex lens element 21 and a negative meniscus lens element 22 having a convex surface on the object side, in that order from the object side. The positive biconvex lens element 21 has an aspherical surface on each side thereof. A diaphragm S (surface No. 5), which is positioned in a plane that is orthogonal to the optical axis and is tangent to the object-side surface of the second lens group G2 (positive biconvex lens element 21) moves integrally with the second lens group G2 during zooming.

The third lens group G3 (surface Nos. 10 and 11) is configured of a positive lens element 31 having a convex surface on the image side. The positive lens element 31 has an aspherical surface on each side thereof.

The negative reflection prism PR2 (surface Nos. 12 and 13) has a convex surface on the object side (incident surface) and a concave surface on the image side (exit surface).

TABLE 1

SURFACE DATA

| Surf. No. | r | d | Nd | νd |
|---|---|---|---|---|
| 1 | −144.433 | 0.500 | 1.69680 | 55.5 |
| 2 | 3.085 | 0.928 | | |
| 3* | 7.992 | 4.226 | 1.63548 | 23.9 |
| 4* | 42.998 | d4 | | |
| 5(Diaphragm) | ∞ | 0.000 | | |
| 6* | 4.010 | 1.438 | 1.59201 | 67.0 |
| 7* | −7.647 | 0.400 | | |
| 8 | 9.822 | 0.688 | 1.60641 | 27.2 |
| 9 | 3.194 | d9 | | |
| 10* | ∞ | 0.986 | 1.54358 | 55.7 |
| 11* | −12.900 | d11 | | |
| 12 | 19.458 | 4.423 | 1.60641 | 27.2 |
| 13 | 15.000 | — | | |

The asterisk (*) designates an aspherical surface which is rotationally symmetrical with respect to the optical axis.

TABLE 2

ZOOM LENS SYSTEM DATA
Zoom Ratio 2.85

| | Short Focal Length Extremity | Intermediate Focal Length | Long Focal Length Extremity |
|---|---|---|---|
| FNO. | 3.5 | 4.3 | 6.0 |
| f | 3.61 | 5.21 | 10.27 |
| W | 36.8 | 25.4 | 12.8 |
| Y | 2.30 | 2.30 | 2.30 |
| fB | 1.03 | 1.03 | 1.03 |
| L | 26.01 | 26.01 | 26.01 |
| d4 | 7.413 | 4.689 | 0.297 |
| d9 | 2.001 | 4.689 | 1.139 |
| d11 | 1.973 | 2.009 | 9.951 |

TABLE 3

Aspherical Surface Data (the aspherical surface coefficients not indicated are zero (0.00)):

| Surf. No. | K | A4 | A6 | A8 | A10 |
|---|---|---|---|---|---|
| 3 | 0.000 | 0.1819E−02 | 0.2222E−03 | −0.1626E−04 | 0.4628E−05 |
| 4 | 0.000 | −0.7711E−03 | −0.1197E−03 | 0.8581E−04 | −0.1169E−04 |
| 6 | 0.000 | −0.2333E−02 | | | |
| 7 | 0.000 | 0.1971E−02 | | | |
| 10 | 0.000 | −0.1211E−02 | −0.1135E−03 | 0.3216E−04 | |
| 11 | 0.000 | −0.1423E−02 | −0.7063E−04 | 0.2382E−04 | |

TABLE 4

LENS GROUP DATA

| Lens Group | 1$^{st}$ Surf. | Focal Length |
|---|---|---|
| 1 (First lens group G1) | 1 | −6.35 |
| 2 (Second lens group G2) | 6 | 7.35 |
| 3 (Third lens group G3) | 10 | 23.73 |
| 4 (Reflection prism PR2) | 12 | −172.62 |

Figure 7:
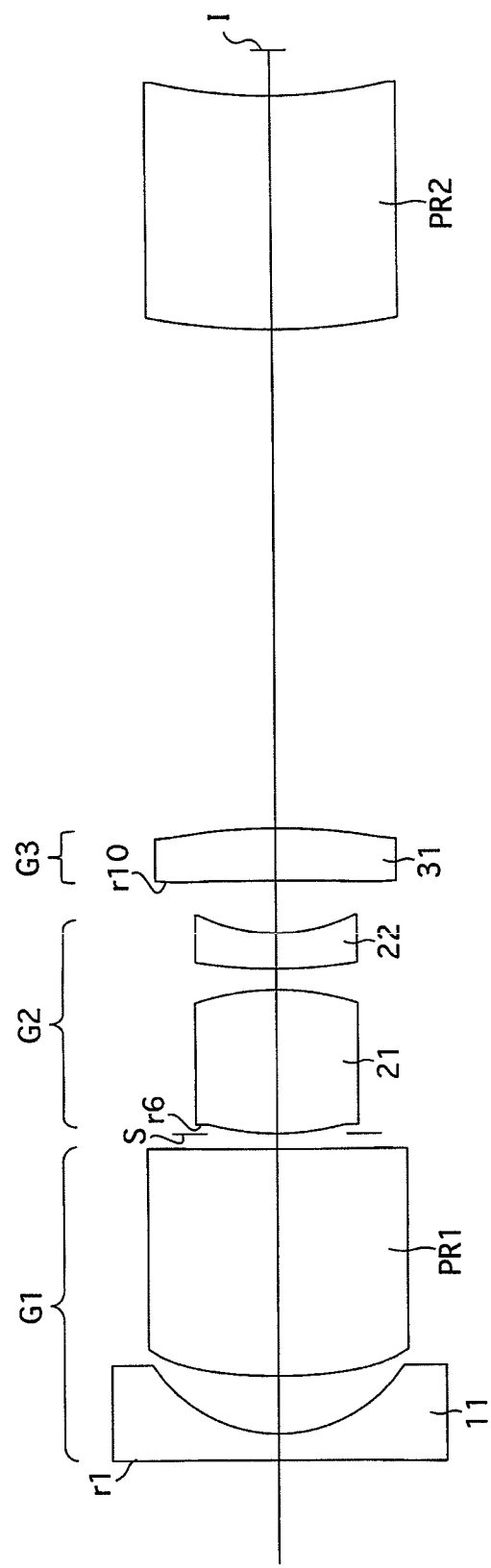
FIG. 7 shows a lens arrangement of a second numerical embodiment of a zoom lens system, according to the present invention, at the long focal length extremity when focused on an object at infinity.
Figure 8:
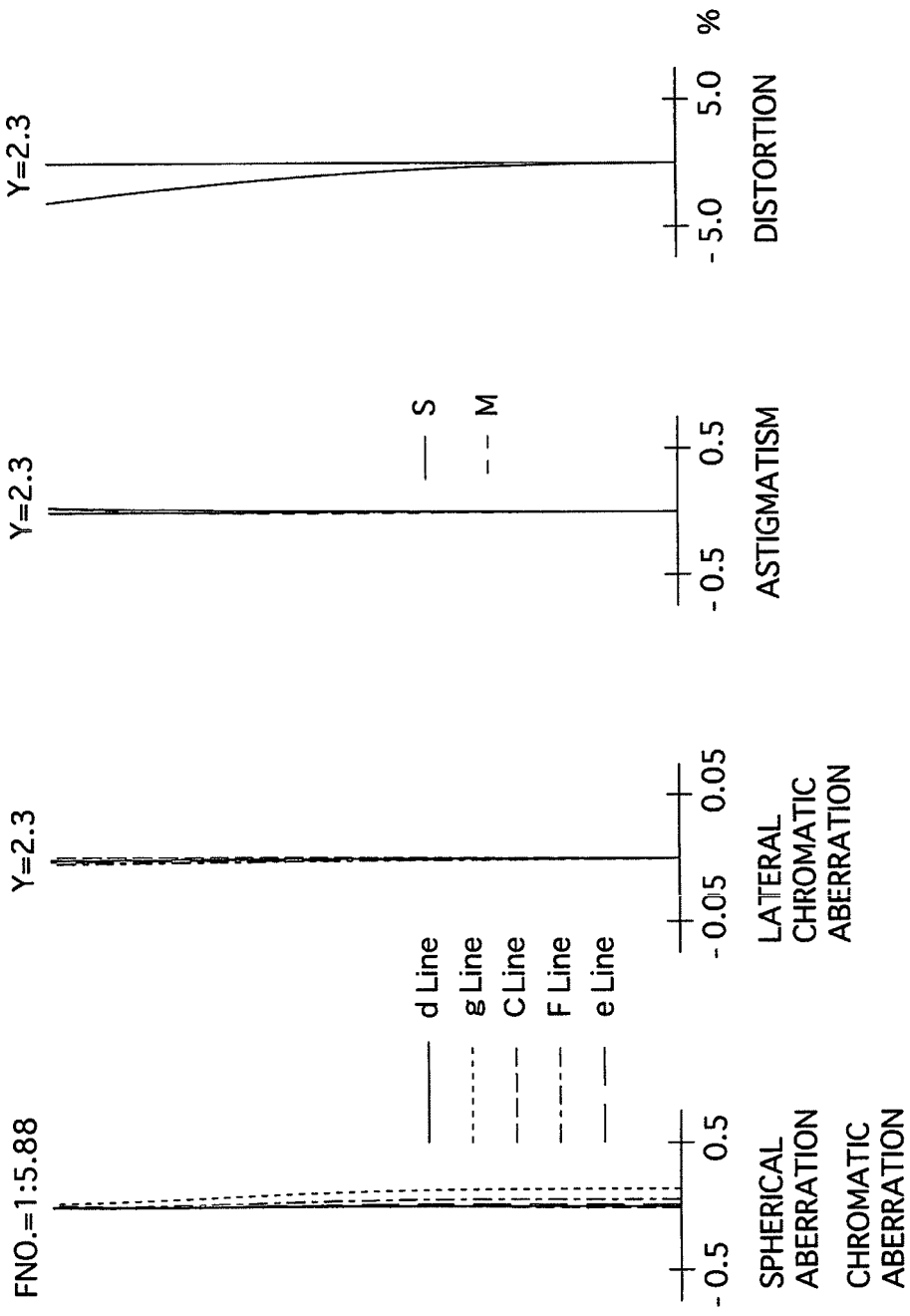
FIGS. 8A, 8B, 8C and 8D show various aberrations that occurred in the lens arrangement shown in FIG. 7.
Figure 9:
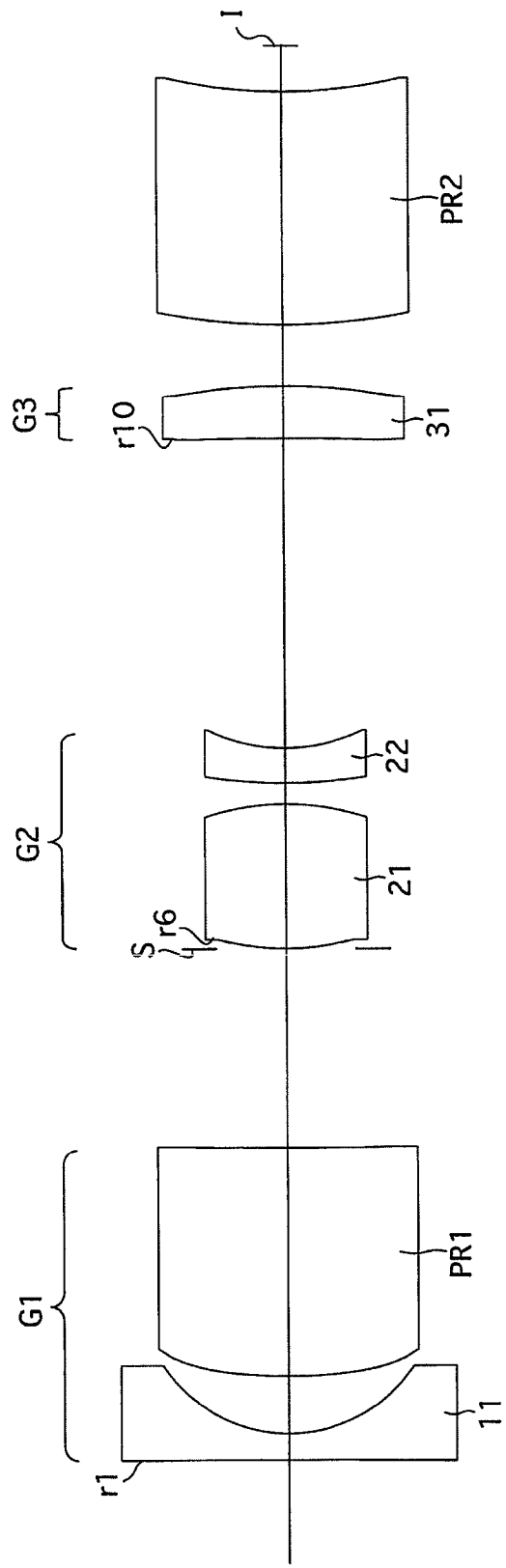
FIG. 9 shows a lens arrangement of the second numerical embodiment of the zoom lens system, according to the present invention, at an intermediate focal length when focused on an object at infinity.
Figure 10:
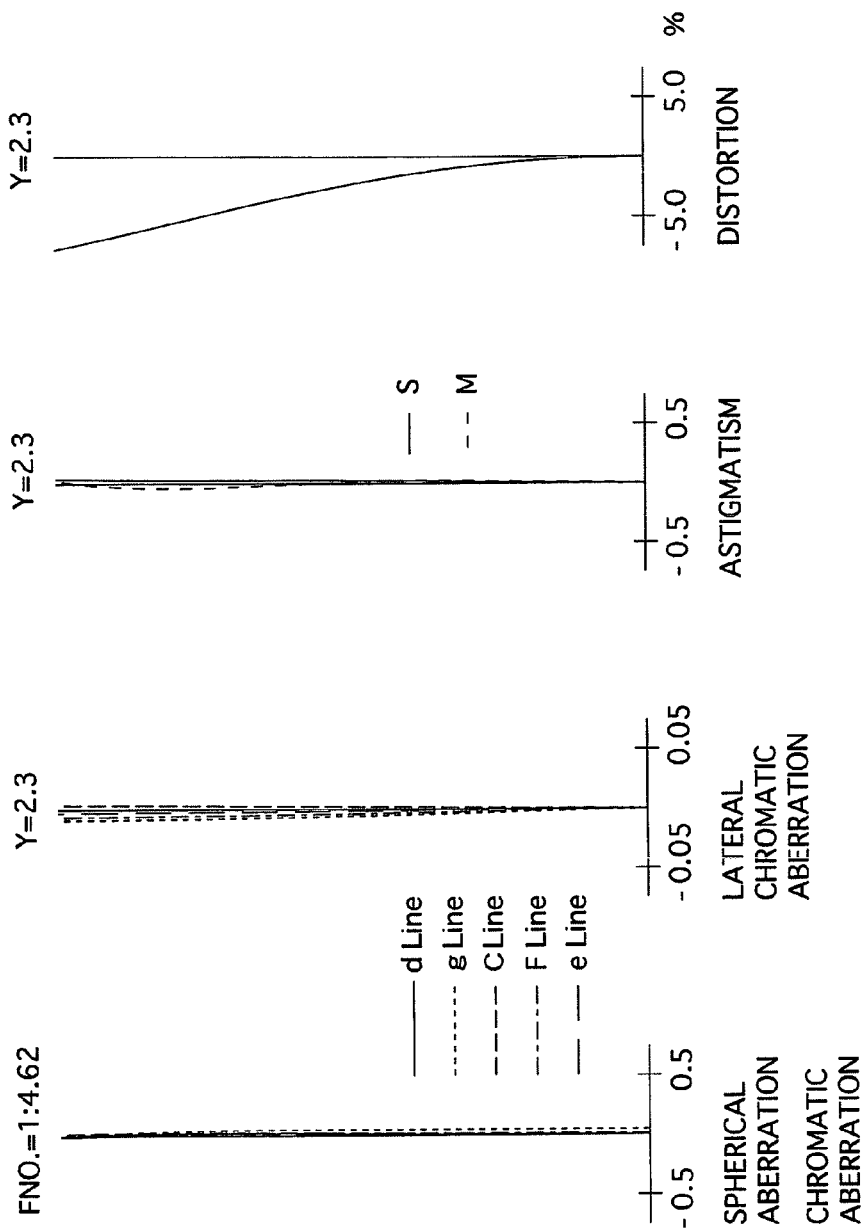
FIGS. 10A, 10B, 10C and 10D show various aberrations that occurred in the lens arrangement shown in FIG. 9.
Figure 11:
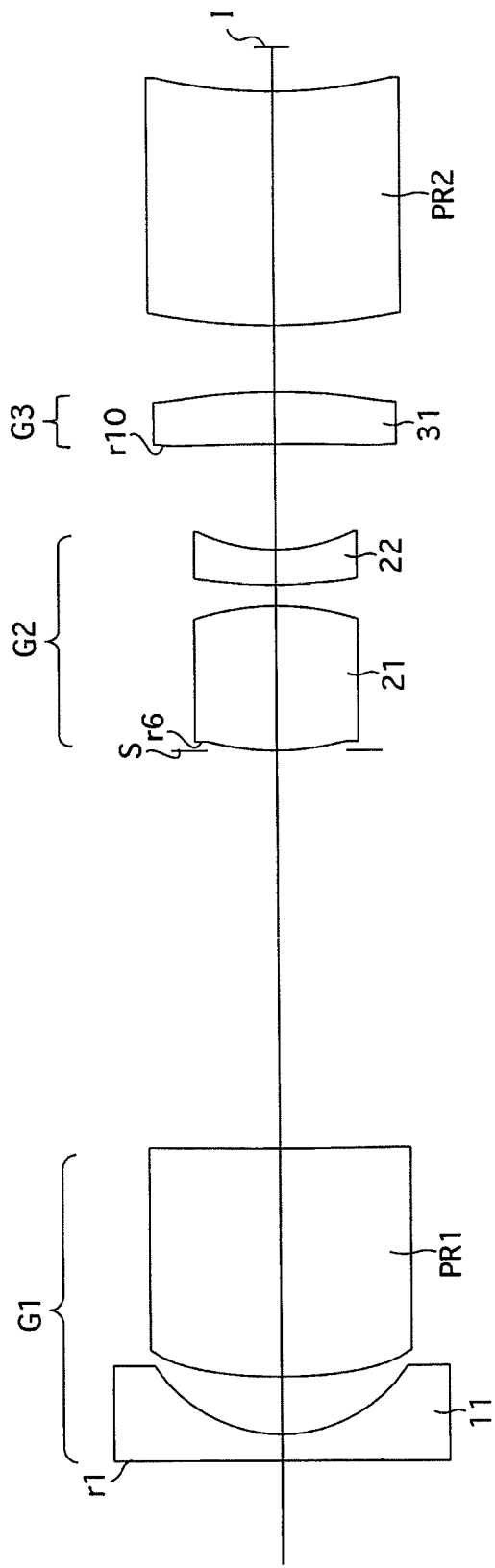
FIG. 11 shows a lens arrangement of the second numerical embodiment of the zoom lens system, according to the present invention, at the short focal length extremity when focused on an object at infinity.
Figure 12:
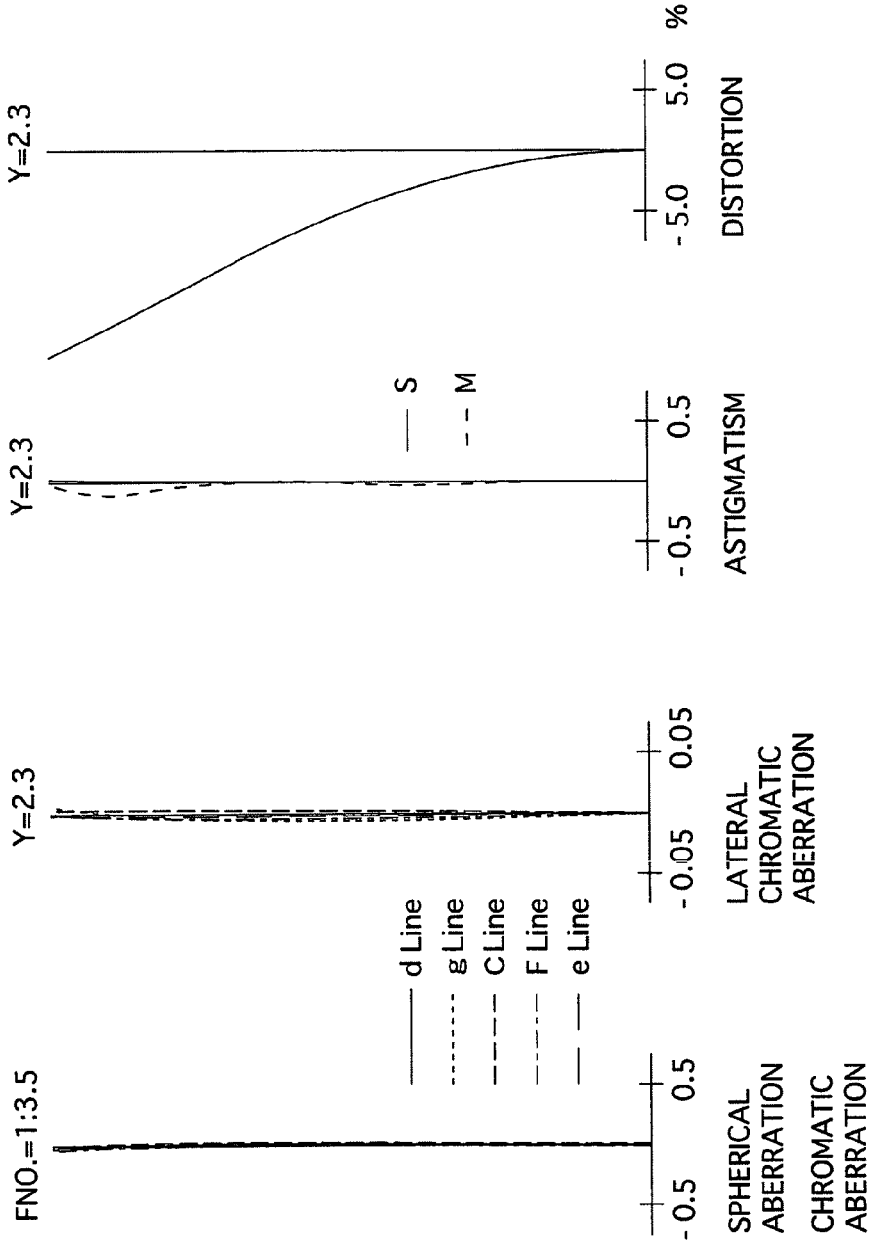
FIGS. 12A, 12B, 12C and 12D show various aberrations that occurred in the lens arrangement shown in FIG. 11.

FIGS. 7 through 12D and Tables 5 through 8 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIG. 9 shows a lens arrangement of the second numerical embodiment of the zoom lens system at an intermediate focal length when focussed on an object at infinity. FIGS. 10A, 10B, 10C and 10D show various aberrations that occurred in the lens arrangement shown in FIG. 9. FIG. 11 shows a lens arrangement of the second numerical embodiment of the zoom lens system at the short focal length extremity when focussed on an object at infinity. FIGS. 12A, 12B, 12C and 12D show various aberrations that occurred in the lens arrangement shown in FIG. 11. Table 5 shows the lens surface data, Table 6 shows various zoom lens system data, Table 7 shows the aspherical surface data, and Table 8 shows the lens group data of the zoom lens system according to the second numerical embodiment.

The fundamental lens arrangement of the second numerical embodiment is the same as that of the first numerical embodiment.

TABLE 5

SURFACE DATA

| Surf. No. | r | d | Nd | νd |
|---|---|---|---|---|
| 1 | −516.136 | 0.500 | 1.69680 | 55.5 |
| 2 | 2.884 | 1.112 | | |
| 3* | 10.314 | 4.347 | 1.63548 | 23.9 |
| 4* | 84.904 | d4 | | |
| 5(Diaphragm) | ∞ | 0.000 | | |
| 6* | 4.821 | 2.744 | 1.55332 | 71.7 |
| 7* | −4.935 | 0.400 | | |
| 8 | 10.113 | 0.672 | 1.60641 | 27.2 |
| 9 | 3.454 | d9 | | |
| 10* | ∞ | 0.996 | 1.54358 | 55.7 |
| 11* | −15.651 | d11 | | |
| 12 | 12.565 | 4.423 | 1.60641 | 27.2 |
| 13 | 10.000 | — | | |

The asterisk (*) designates an aspherical surface which is rotationally symmetrical with respect to the optical axis.

TABLE 6

ZOOM LENS SYSTEM DATA
Zoom Ratio 2.87

| | Short Focal Length Extremity | Intermediate Focal Length | Long Focal Length Extremity |
|---|---|---|---|
| FNO. | 3.5 | 4.6 | 5.9 |
| f | 3.01 | 5.06 | 8.63 |
| W | 42.7 | 26.2 | 15.4 |
| Y | 2.30 | 2.30 | 2.30 |
| fB | 1.01 | 1.01 | 1.01 |
| L | 26.99 | 26.99 | 26.99 |

TABLE 6-continued

ZOOM LENS SYSTEM DATA
Zoom Ratio 2.87

|  | Short Focal Length Extremity | Intermediate Focal Length | Long Focal Length Extremity |
|---|---|---|---|
| d4 | 7.523 | 3.751 | 0.300 |
| d9 | 1.962 | 5.776 | 0.997 |
| d11 | 1.3113 | 1.269 | 9.499 |

TABLE 7

Aspherical Surface Data (the aspherical surface coefficients not indicated are zero (0.00)):

| Surf. No. | K | A4 | A6 | A8 | A10 |
|---|---|---|---|---|---|
| 3 | 0.000 | 0.2390E−02 | 0.4593E−03 | −0.5055E−04 | 0.9365E−05 |
| 4 | 0.000 | −0.8829E−03 | 0.1191E−03 | 0.4734E−04 | −0.7808E−05 |
| 6 | 0.000 | −0.3801E−02 | | | |
| 7 | 0.000 | 0.1078E−02 | | | |
| 10 | 0.000 | −0.5986E−02 | 0.1289E−02 | −0.3152E−04 | |
| 11 | 0.000 | −0.6037E−02 | 0.8594E−03 | 0.1647E−04 | |

TABLE 8

LENS GROUP DATA

| Lens Group | 1$^{st}$ Surf. | Focal Length |
|---|---|---|
| 1 (First lens group G1) | 1 | −5.63 |
| 2 (Second lens group G2) | 6 | 7.16 |
| 3 (Third lens group G3) | 10 | 28.79 |
| 4 (Reflection prism PR2) | 12 | −231.37 |

Numerical Embodiment 3

Figure 13:
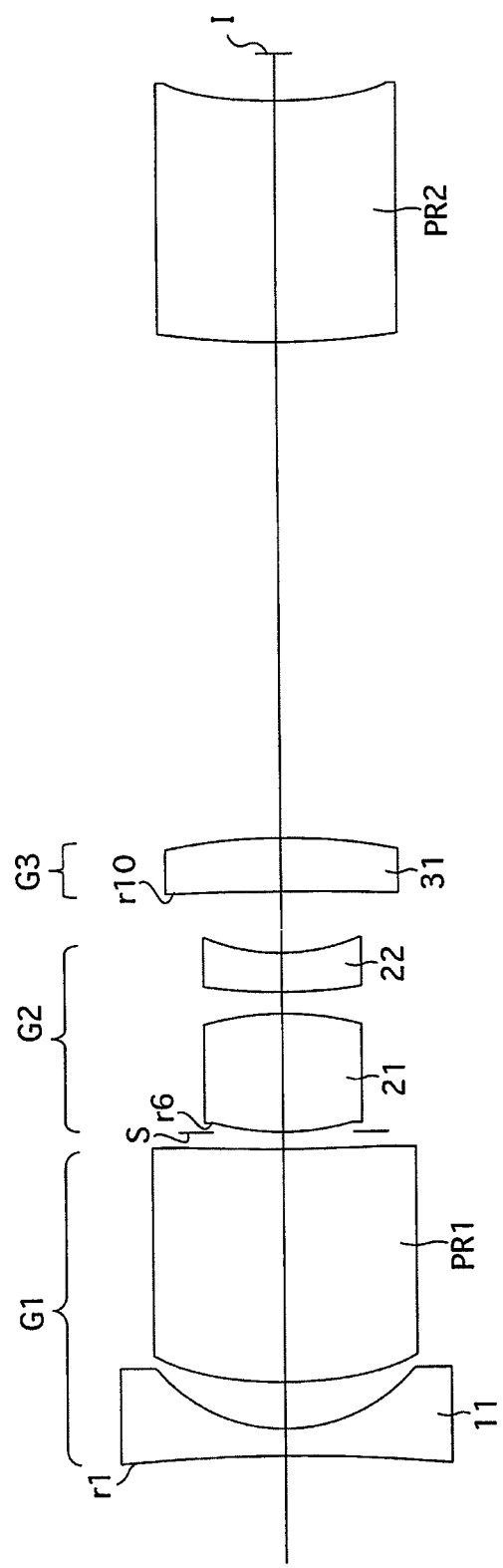
FIG. 13 shows a lens arrangement of a third numerical embodiment of a zoom lens system, according to the present invention, at the long focal length extremity when focused on an object at infinity.
Figures 14A, 14B, 14C, 14D:
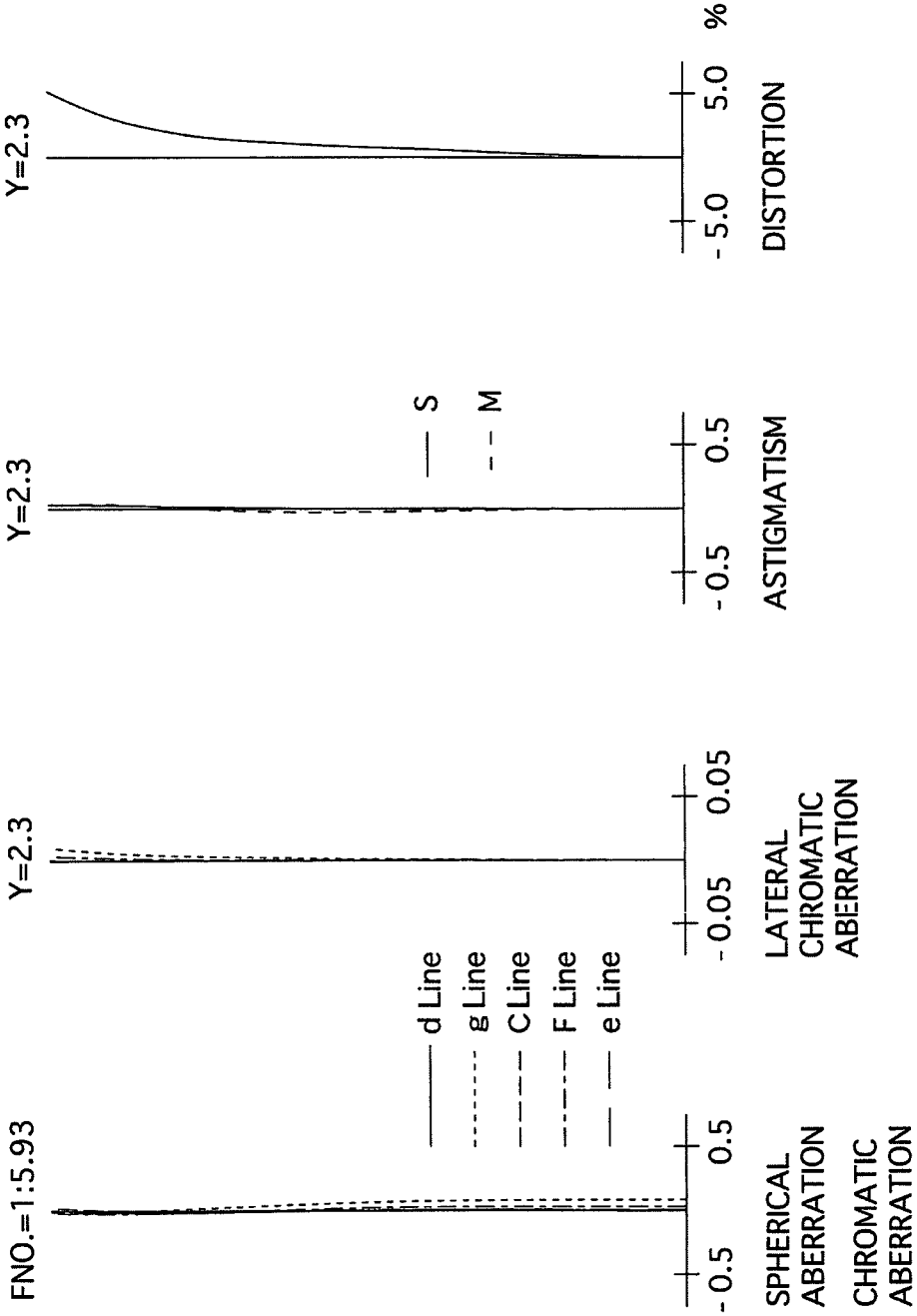
FIGS. 14A, 14B, 14C and 14D show various aberrations that occurred in the lens arrangement shown in FIG. 13.
Figure 15:
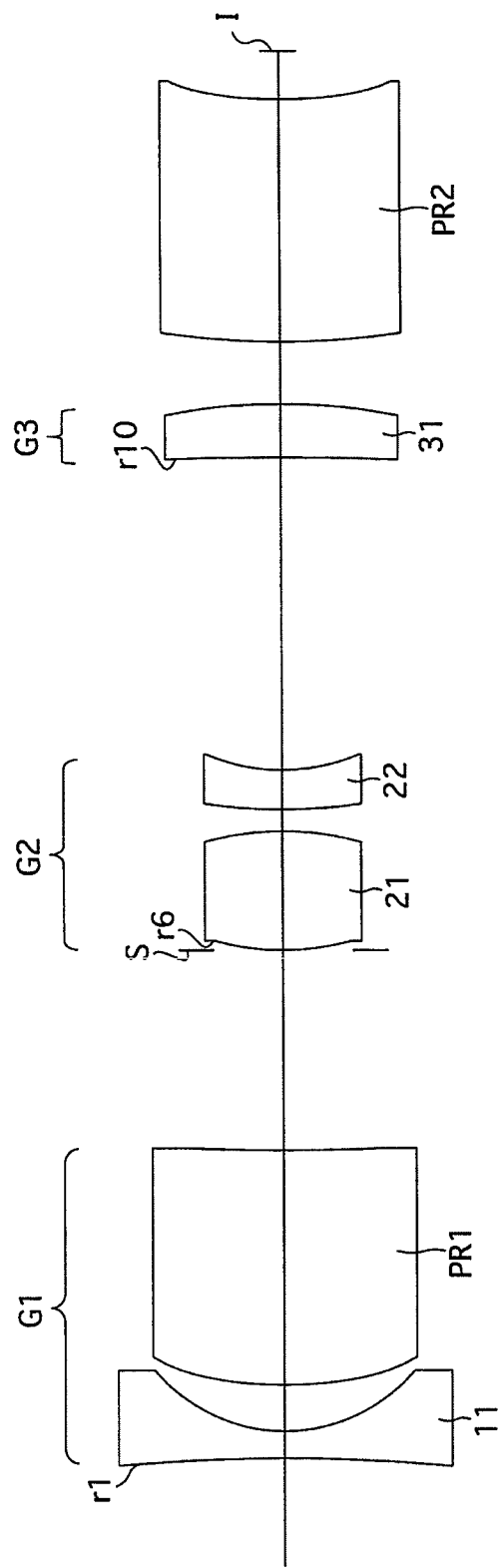
FIG. 15 shows a lens arrangement of the third numerical embodiment of the zoom lens system, according to the present invention, at an intermediate focal length when focused on an object at infinity.
Figure 16:
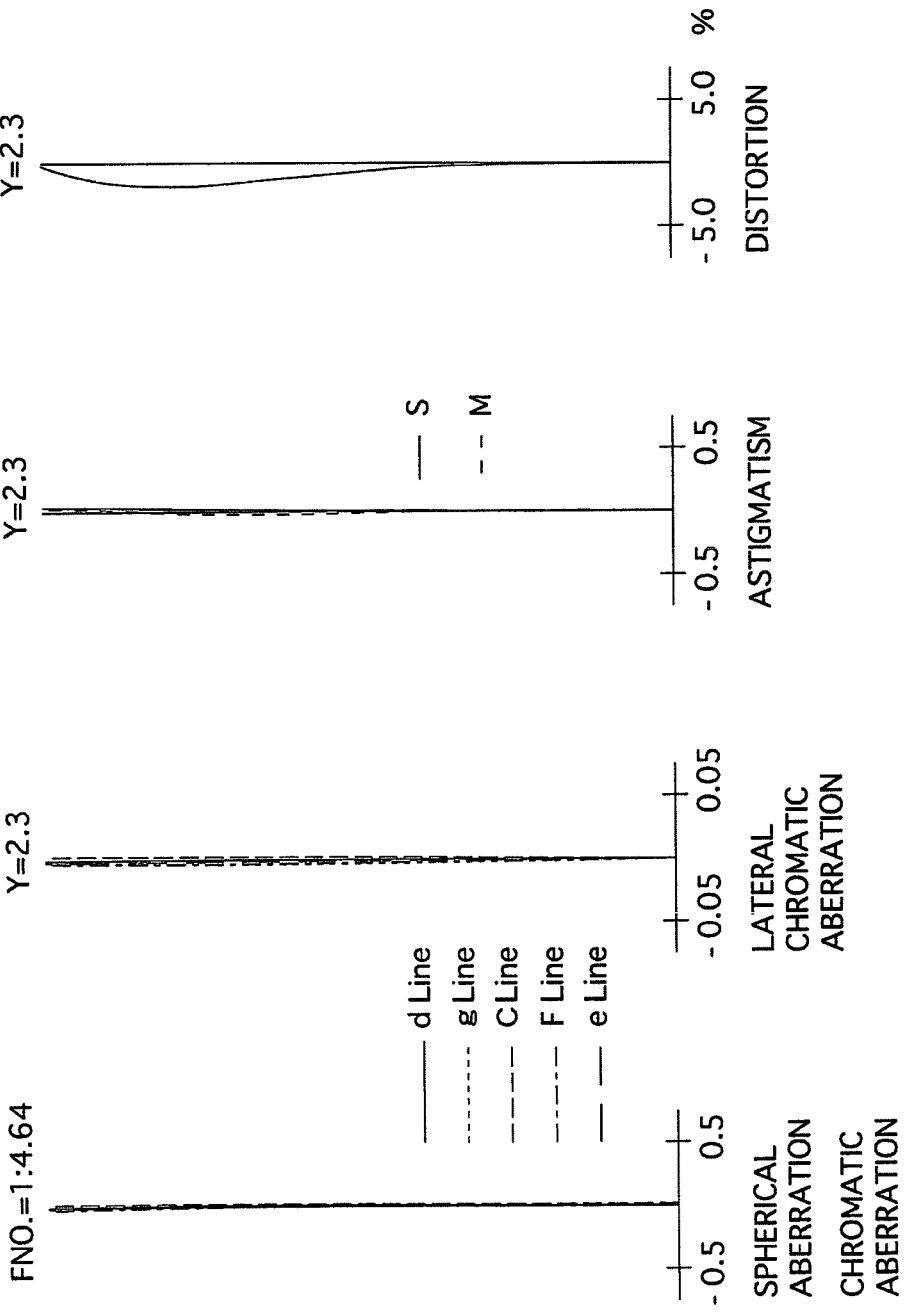
FIGS. 16A, 16B, 16C and 16D show various aberrations that occurred in the lens arrangement shown in FIG. 15.
Figure 17:
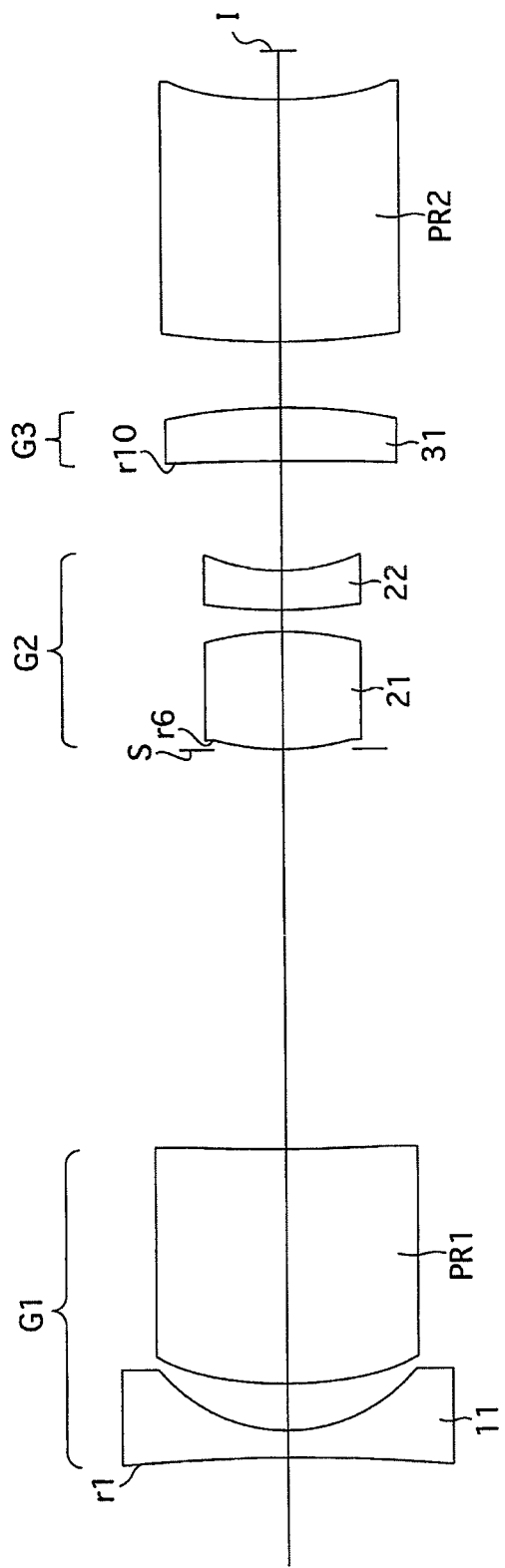
FIG. 17 shows a lens arrangement of the third numerical embodiment of the zoom lens system, according to the present invention, at the short focal length extremity when focused on an object at infinity.
Figure 18:
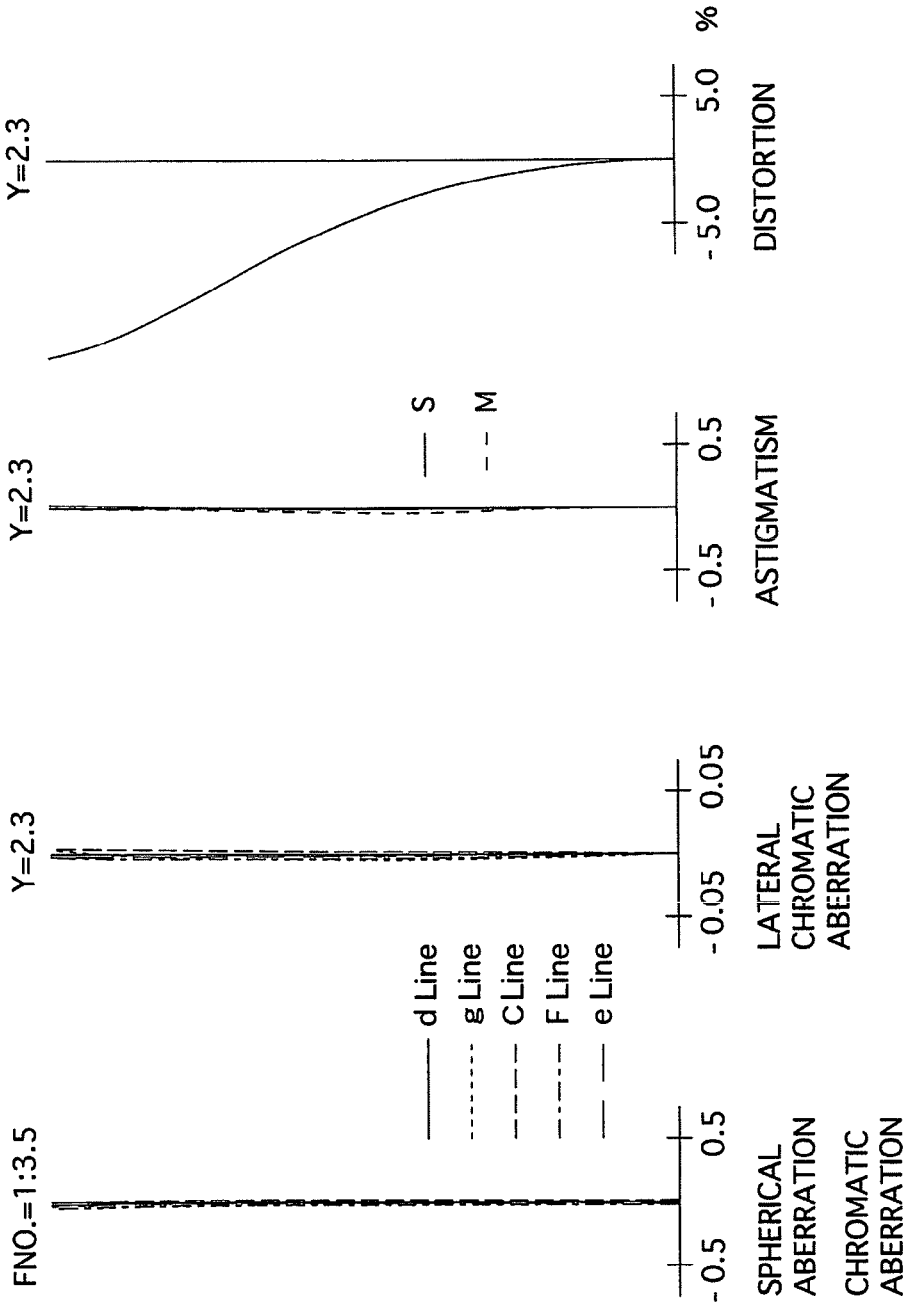
FIGS. 18A, 18B, 18C and 18D show various aberrations that occurred in the lens arrangement shown in FIG. 17.

FIGS. 13 through 18D and Tables 9 through 12 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIG. 15 shows a lens arrangement of the third numerical embodiment of the zoom lens system at an intermediate focal length when focussed on an object at infinity. FIGS. 16A, 16B, 16C and 16D show various aberrations that occurred in the lens arrangement shown in FIG. 15. FIG. 17 shows a lens arrangement of the third numerical embodiment of the zoom lens system at the short focal length extremity when focussed on an object at infinity. FIGS. 18A, 18B, 18C and 18D show various aberrations that occurred in the lens arrangement shown in FIG. 17. Table 9 shows the lens surface data, Table 10 shows various zoom lens system data, Table 11 shows the aspherical surface data, and Table 12 shows the lens group data of the zoom lens system according to the third numerical embodiment.

The fundamental lens arrangement of the third numerical embodiment is the same as that of the first numerical embodiment except for the reflection prism PR2 having an aspherical surface on each of the object-side surface (incident surface) and the image-side surface (exit surface).

TABLE 9

SURFACE DATA

| Surf. No. | r | d | Nd | vd |
|---|---|---|---|---|
| 1 | −34.299 | 0.500 | 1.69680 | 55.5 |
| 2 | 3.100 | 0.874 | | |
| 3* | 8.140 | 4.299 | 1.63548 | 23.9 |
| 4* | 36.158 | d4 | | |
| 5(Diaphragm) | ∞ | 0.000 | | |
| 6* | 4.583 | 2.165 | 1.55332 | 71.7 |

TABLE 9-continued

SURFACE DATA

| Surf. No. | r | d | Nd | vd |
|---|---|---|---|---|
| 7* | −5.406 | 0.400 | | |
| 8 | 9.827 | 0.722 | 1.60641 | 27.2 |
| 9 | 3.673 | d9 | | |
| 10* | ∞ | 0.975 | 1.54358 | 55.7 |
| 11* | −14.410 | d11 | | |
| 12* | 15.170 | 4.423 | 1.68893 | 31.2 |
| 13* | 11.000 | — | | |

The asterisk (*) designates an aspherical surface which is rotationally symmetrical with respect to the optical axis.

TABLE 10

ZOOM LENS SYSTEM DATA
Zoom Ratio 2.93

|  | Short Focal Length Extremity | Intermediate Focal Length | Long Focal Length Extremity |
|---|---|---|---|
| FNO. | 3.5 | 4.6 | 5.9 |
| f | 3.00 | 5.10 | 8.80 |
| W | 42.2 | 24.3 | 14.0 |
| Y | 2.30 | 2.30 | 2.30 |
| fB | 1.00 | 1.00 | 1.00 |
| L | 25.90 | 25.90 | 25.90 |
| d4 | 7.325 | 3.684 | 0.319 |
| d9 | 1.994 | 5.737 | 1.139 |
| d11 | 1.219 | 1.117 | 9.080 |

TABLE 11

Aspherical Surface Data (the aspherical surface coefficients not indicated are zero (0.00)):

| Surf. No. | K | A4 | A6 | A8 | A10 |
|---|---|---|---|---|---|
| 3 | 0.000 | 0.2232E−02 | 0.2431E−03 | −0.1565E−04 | 0.4676E−05 |
| 4 | 0.000 | −0.7383E−03 | −0.8727E−04 | 0.1192E−03 | −0.1908E−04 |
| 6 | 0.000 | −0.3563E−02 | | | |
| 7 | 0.000 | 0.1085E−02 | | | |
| 10 | 0.000 | −0.4295E−02 | 0.6693E−03 | −0.1776E−04 | |
| 11 | 0.000 | −0.4405E−02 | 0.4353E−03 | 0.9364E−05 | |
| 12 | 0.000 | 0.5154E−03 | −0.2002E−03 | 0.1794E−04 | |
| 13 | 0.000 | 0.9468E−02 | −0.2045E−02 | 0.3651E−03 | |

TABLE 12

LENS GROUP DATA

| Lens Group | 1st Surf. | Focal Length |
|---|---|---|
| 1 (First lens group G1) | 1 | −5.57 |
| 2 (Second lens group G2) | 6 | 6.80 |
| 3 (Third lens group G3) | 10 | 26.51 |
| 4 (Reflection prism PR2) | 12 | −102.40 |

Numerical Embodiment 4

Figure 19:
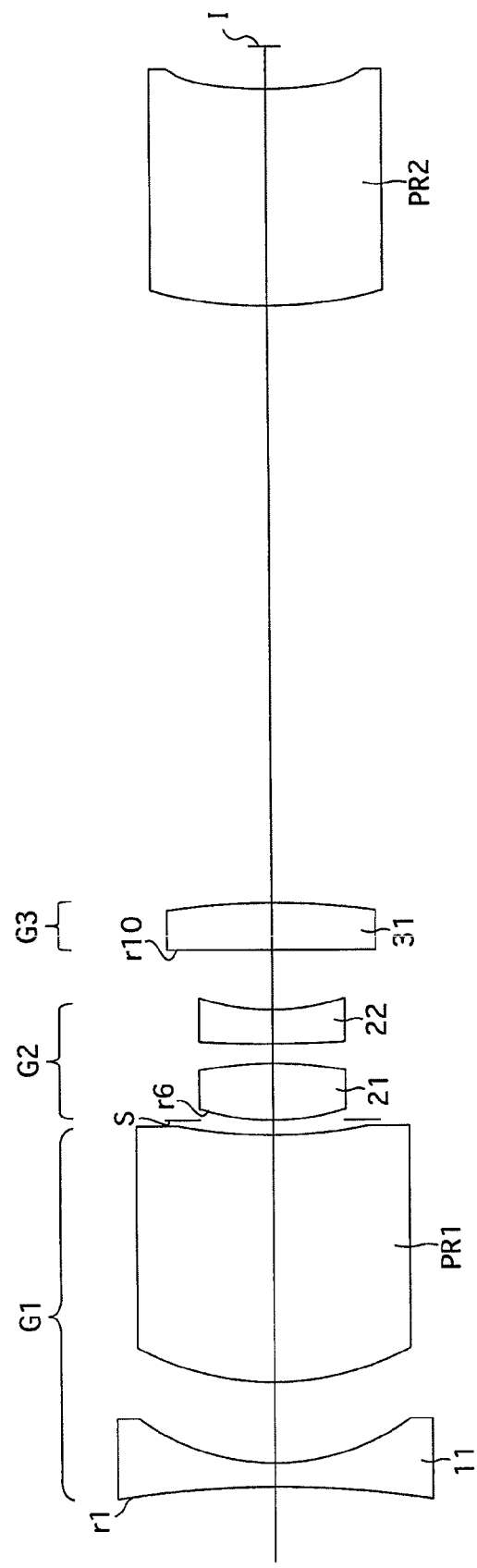
FIG. 19 shows a lens arrangement of a fourth numerical embodiment of a zoom lens system, according to the present invention, at the long focal length extremity when focused on an object at infinity.
Figure 20:
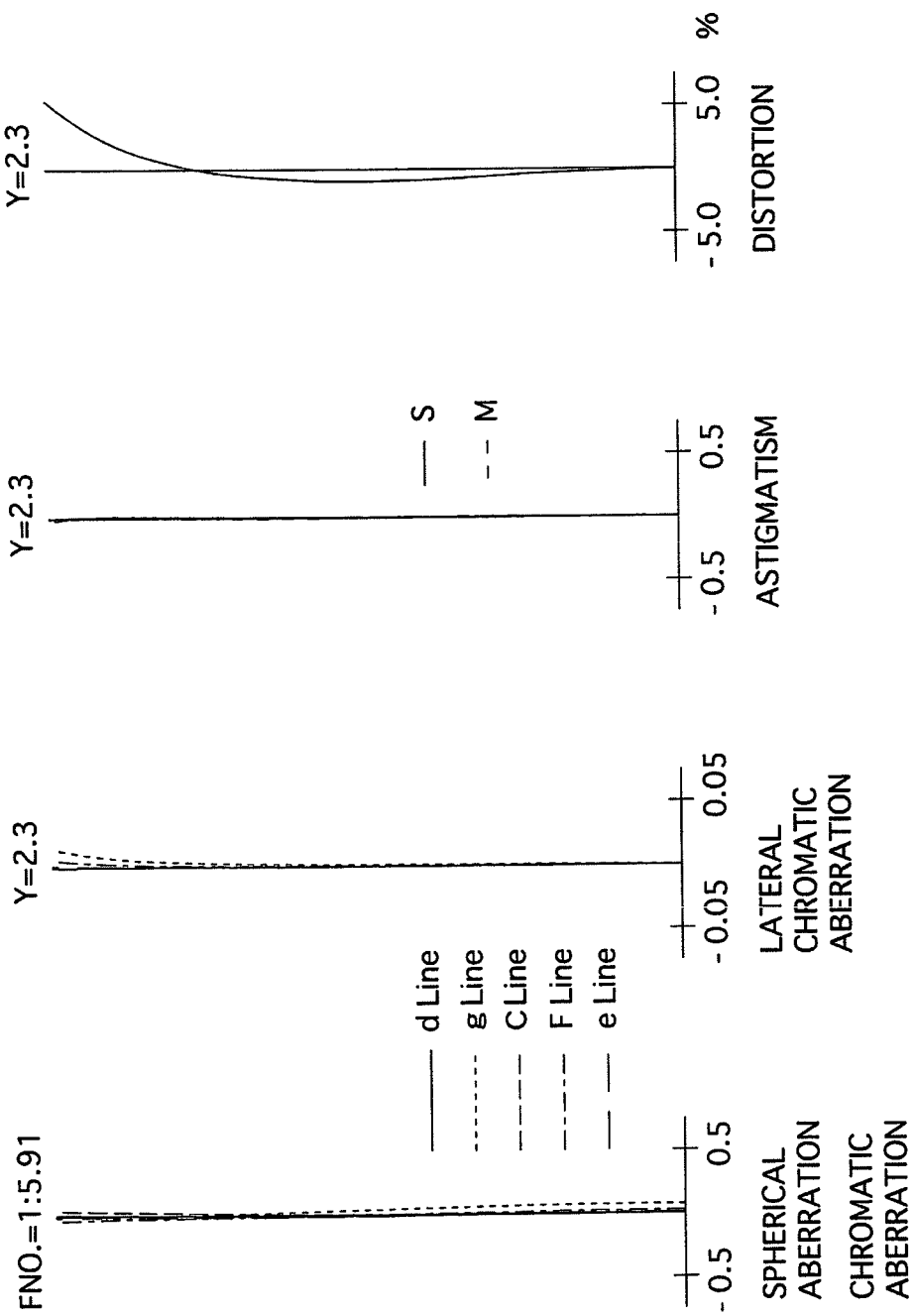
FIGS. 20A, 20B, 20C and 20D show various aberrations that occurred in the lens arrangement shown in FIG. 19.
Figure 21:
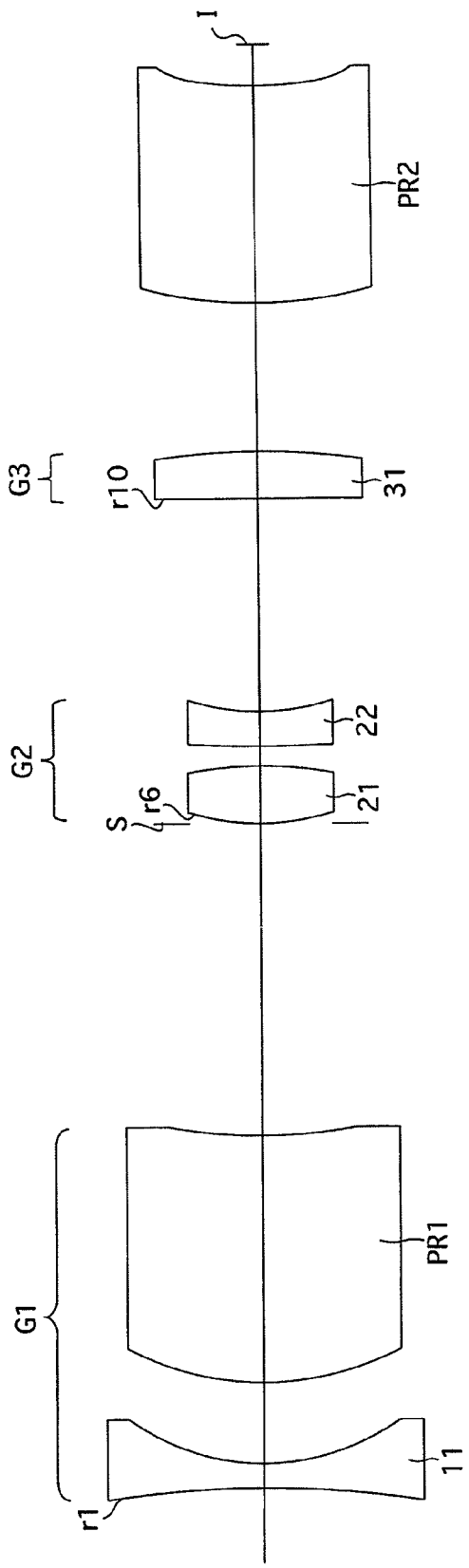
FIG. 21 shows a lens arrangement of the fourth numerical embodiment of the zoom lens system, according to the present invention, at an intermediate focal length when focused on an object at infinity.
Figure 23:
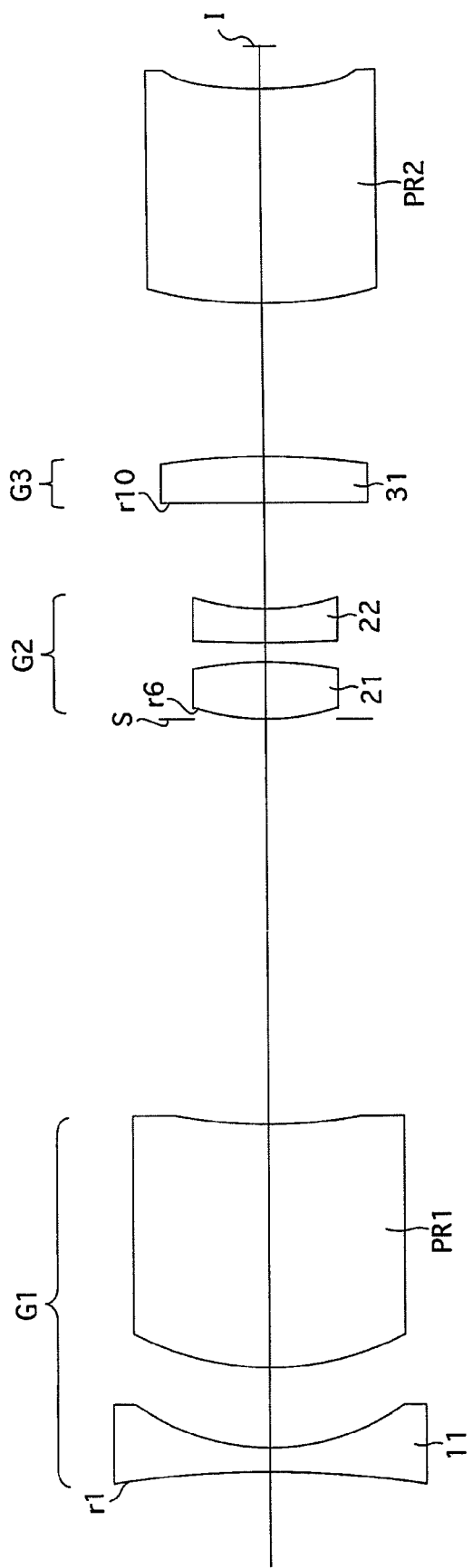
FIG. 23 shows a lens arrangement of the fourth numerical embodiment of the zoom lens system, according to the present invention, at the short focal length extremity when focused on an object at infinity.
Figure 24:
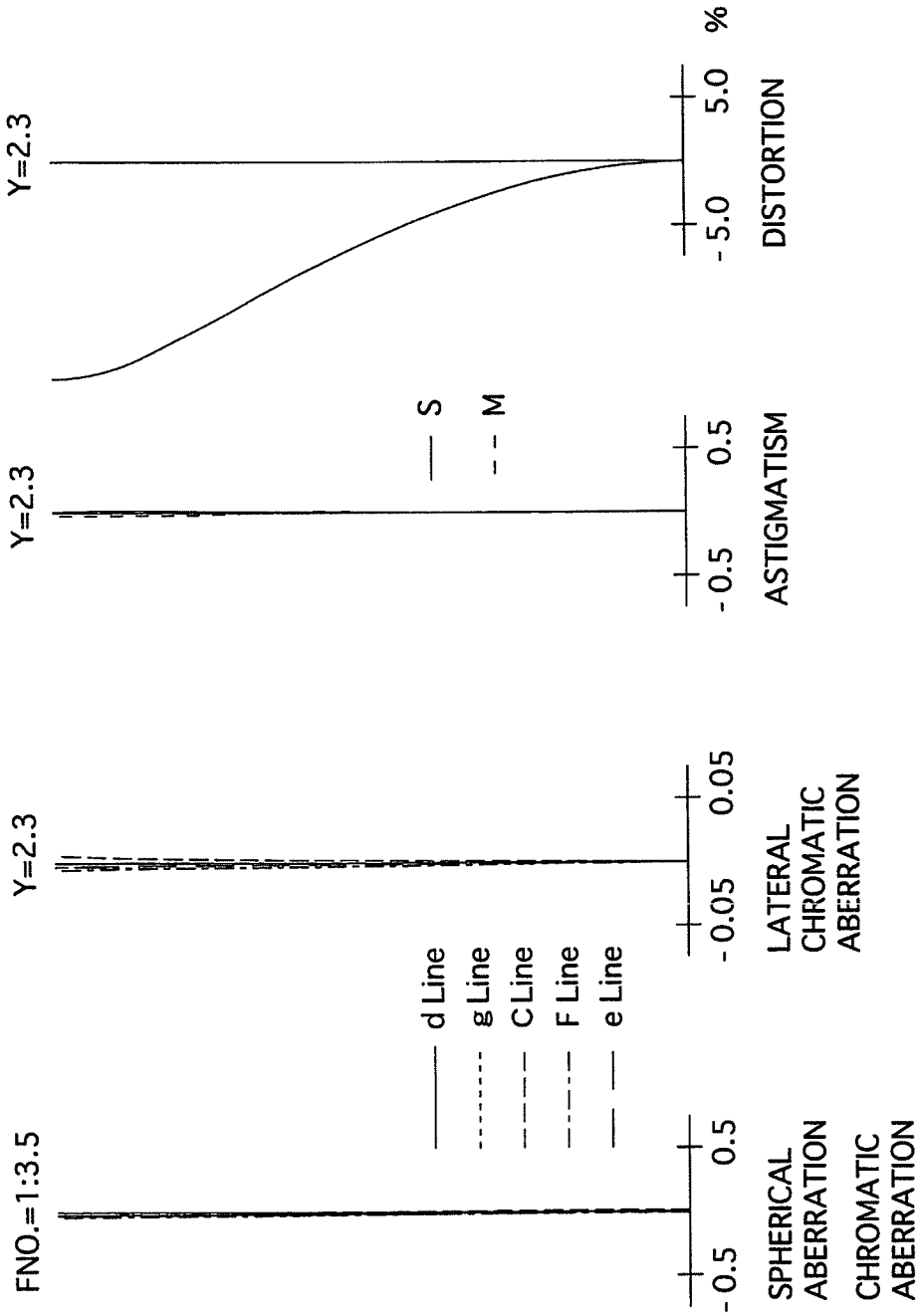
FIGS. 24A, 24B, 24C and 24D show various aberrations that occurred in the lens arrangement shown in FIG. 23.

FIGS. 19 through 24D and Tables 13 through 16 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIG. 21 shows a lens arrangement of the fourth numerical embodiment of the zoom lens system at an intermediate focal length when focussed on an object at infinity. FIGS. 22A, 22B, 22C and 22D show various aberrations that occurred in the lens arrangement shown in FIG. 21. FIG. 23 shows a lens arrangement of the fourth numerical embodiment of the zoom lens system at the short focal length extremity when focussed on an object at infinity. FIGS. 24A, 24B, 24C and 24D show various aberrations that occurred in the lens arrangement shown in FIG. 23. Table 13 shows the lens surface data, Table 14 shows various zoom lens system data, Table 15 shows the aspherical surface data, and Table 16 shows the lens group data of the zoom lens system according to the fourth numerical embodiment.

The fundamental lens arrangement of the fourth numerical embodiment is the same as that of the third numerical embodiment except for the reflection prism PR1 having a spherical surface (not an aspherical surface) on each of the object-side surface (incident surface) and the image-side surface (exit surface).

TABLE 13

SURFACE DATA

| Surf. No. | r | d | Nd | νd |
|---|---|---|---|---|
| 1 | −21.004 | 0.500 | 1.69680 | 55.5 |
| 2 | 4.728 | 1.673 | | |
| 3 | 5.979 | 5.069 | 1.63548 | 23.9 |
| 4 | 10.551 | d4 | | |
| 5(Diaphragm) | ∞ | 0.000 | | |
| 6* | 4.815 | 1.168 | 1.59201 | 67.0 |
| 7* | −7.943 | 0.400 | | |
| 8 | 28.696 | 0.705 | 1.60641 | 27.2 |
| 9 | 4.875 | d9 | | |
| 10* | ∞ | 0.952 | 1.54358 | 55.7 |
| 11* | −15.092 | d11 | | |
| 12* | 10.239 | 4.423 | 1.60641 | 27.2 |
| 13* | 8.500 | — | | |

The asterisk (*) designates an aspherical surface which is rotationally symmetrical with respect to the optical axis.

TABLE 14

ZOOM LENS SYSTEM DATA
Zoom Ratio 2.85

| | Short Focal Length Extremity | Intermediate Focal Length | Long Focal Length Extremity |
|---|---|---|---|
| FNO. | 3.5 | 4.0 | 5.9 |
| f | 4.00 | 5.05 | 11.40 |
| W | 34.7 | 25.9 | 10.8 |
| Y | 2.30 | 2.30 | 2.30 |
| fB | 1.00 | 1.00 | 1.00 |
| L | 29.63 | 29.63 | 29.63 |
| d4 | 8.378 | 6.364 | 0.292 |
| d9 | 2.187 | 4.346 | 1.187 |
| d11 | 3.174 | 3.029 | 12.260 |

TABLE 15

Aspherical Surface Data (the aspherical surface coefficients not indicated are zero (0.00)):

| Surf. No. | K | A4 | A6 | A8 | A10 |
|---|---|---|---|---|---|
| 6 | 0.000 | −0.1415E−02 | | | |
| 7 | 0.000 | 0.1446E−02 | | | |
| 10 | 0.000 | 0.5525E−03 | −0.1559E−03 | 0.9051E−05 | |
| 11 | 0.000 | 0.2841E−03 | −0.4881E−04 | 0.2409E−05 | |
| 12 | 0.000 | 0.1304E−03 | 0.4471E−03 | −0.7823E−04 | 0.4892E−05 |
| 13 | 0.000 | −0.5800E−02 | 0.5656E−02 | −0.1023E−02 | 0.1286E−03 |

TABLE 16

LENS GROUP DATA

| Lens Group | 1st Surf. | Focal Length |
|---|---|---|
| 1 (First lens group G1) | 1 | −7.73 |
| 2 (Second lens group G2) | 6 | 8.62 |
| 3 (Third lens group G3) | 10 | 27.76 |
| 4 (Reflection prism PR2) | 12 | −2075.26 |

Numerical Embodiment 5

Figure 25:
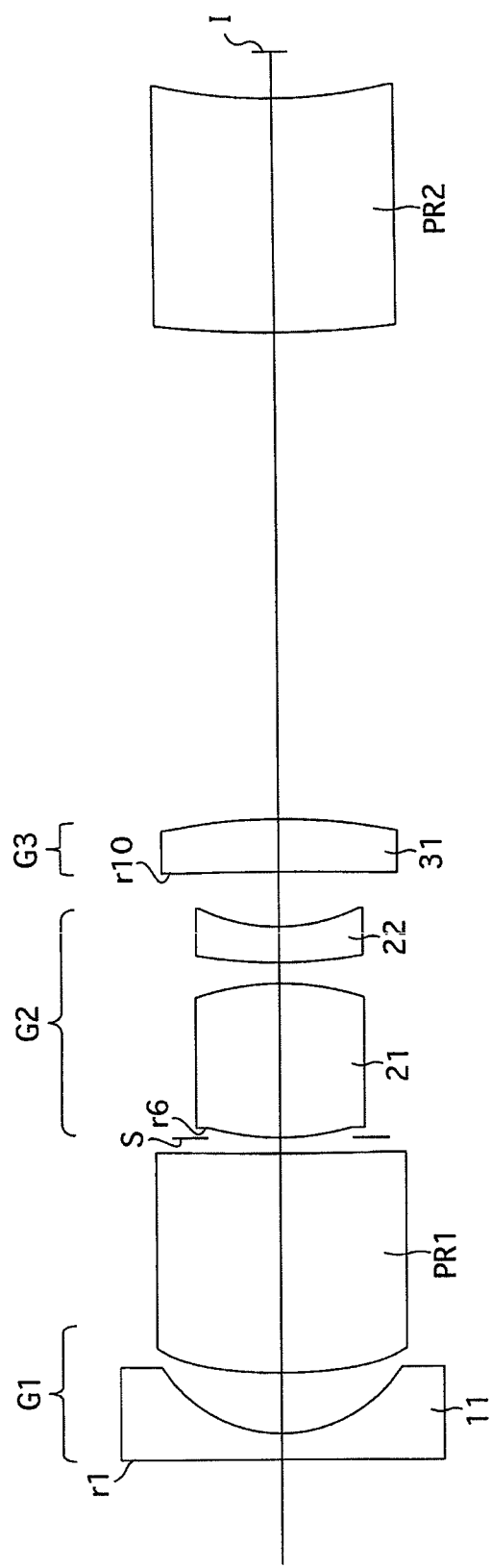
FIG. 25 shows a lens arrangement of a fifth numerical embodiment of a zoom lens system, according to the present invention, at the long focal length extremity when focused on an object at infinity.
Figures 26A, 26B, 26C, 26D:
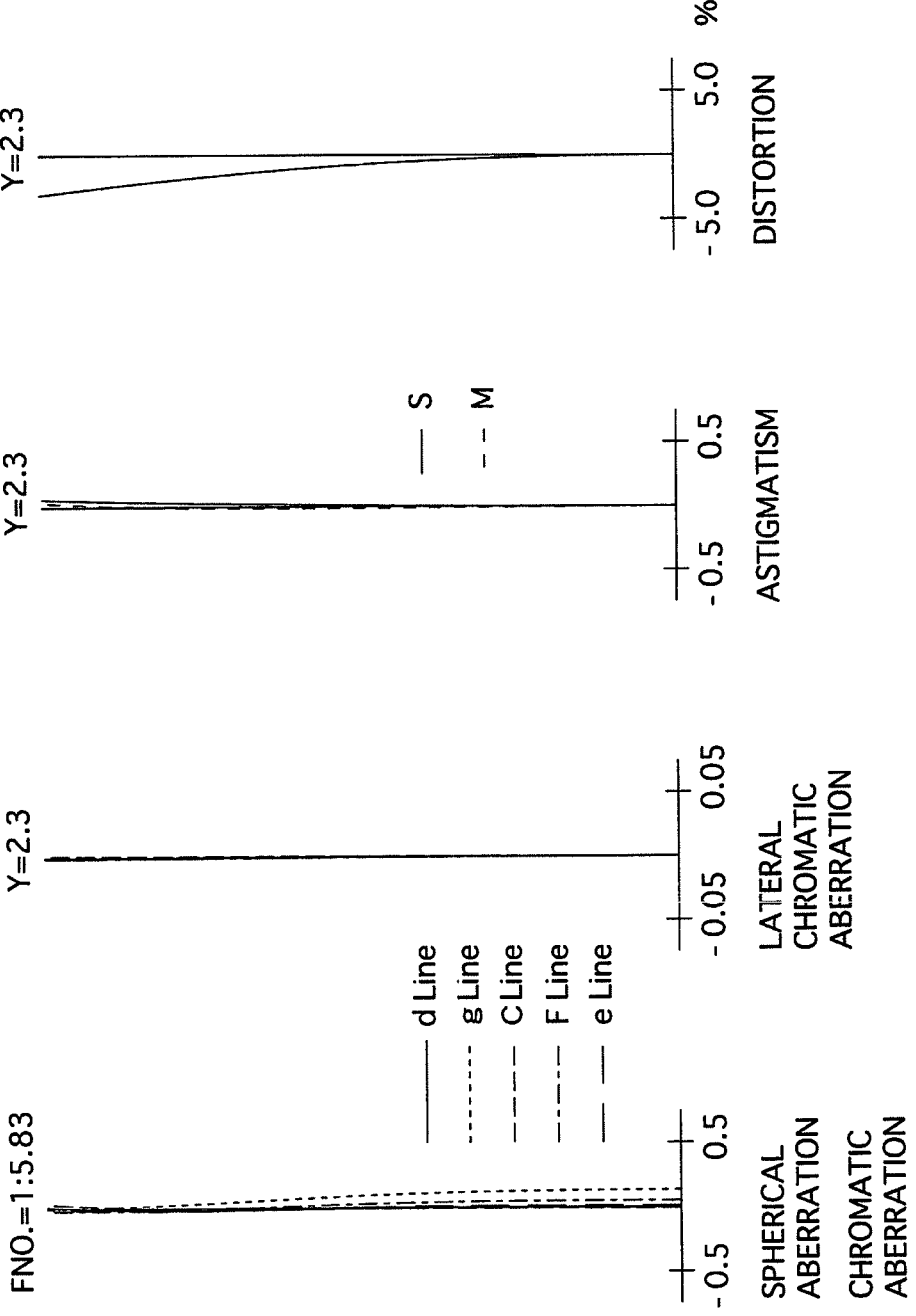
FIGS. 26A, 26B, 26C and 26D show various aberrations that occurred in the lens arrangement shown in FIG. 25.
Figure 27:
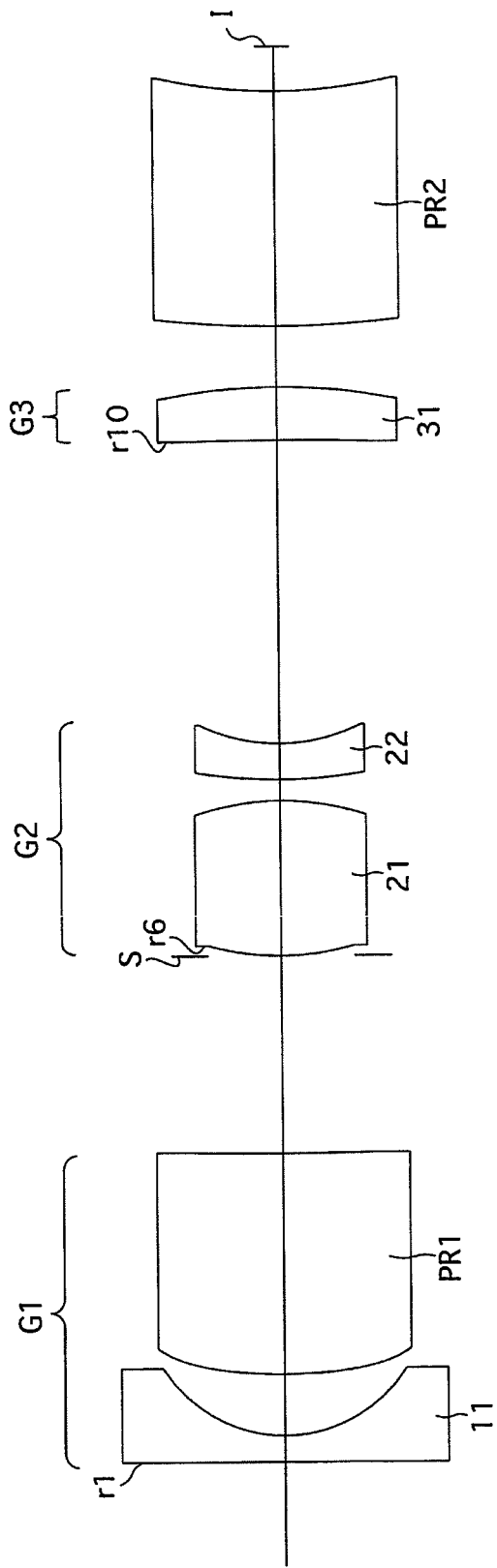
FIG. 27 shows a lens arrangement of the fifth numerical embodiment of the zoom lens system, according to the present invention, at an intermediate focal length when focused on an object at infinity.
Figures 28A, 28B, 28C, 28D:
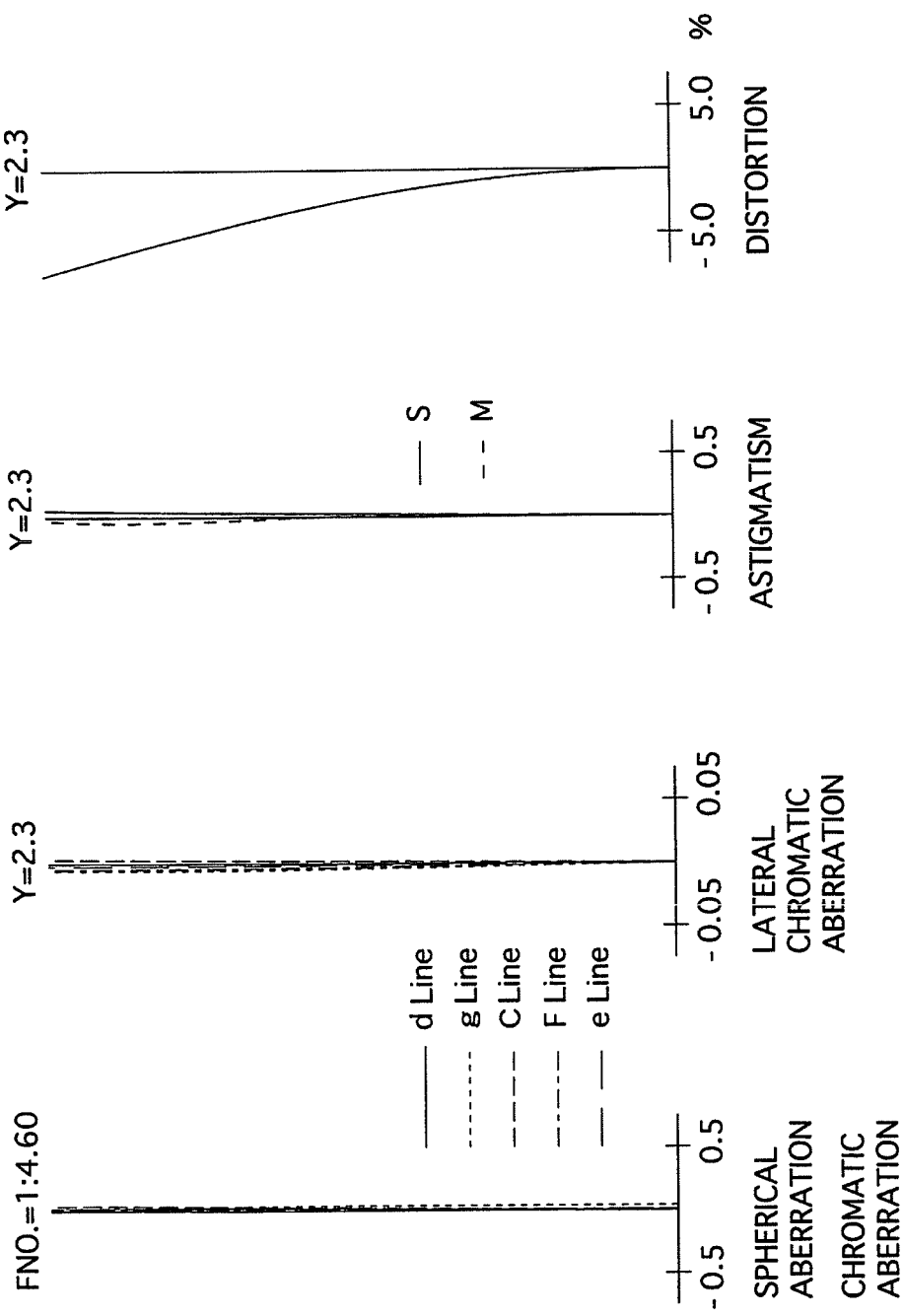
FIGS. 28A, 28B, 28C and 28D show various aberrations that occurred in the lens arrangement shown in FIG. 27.
Figure 29:
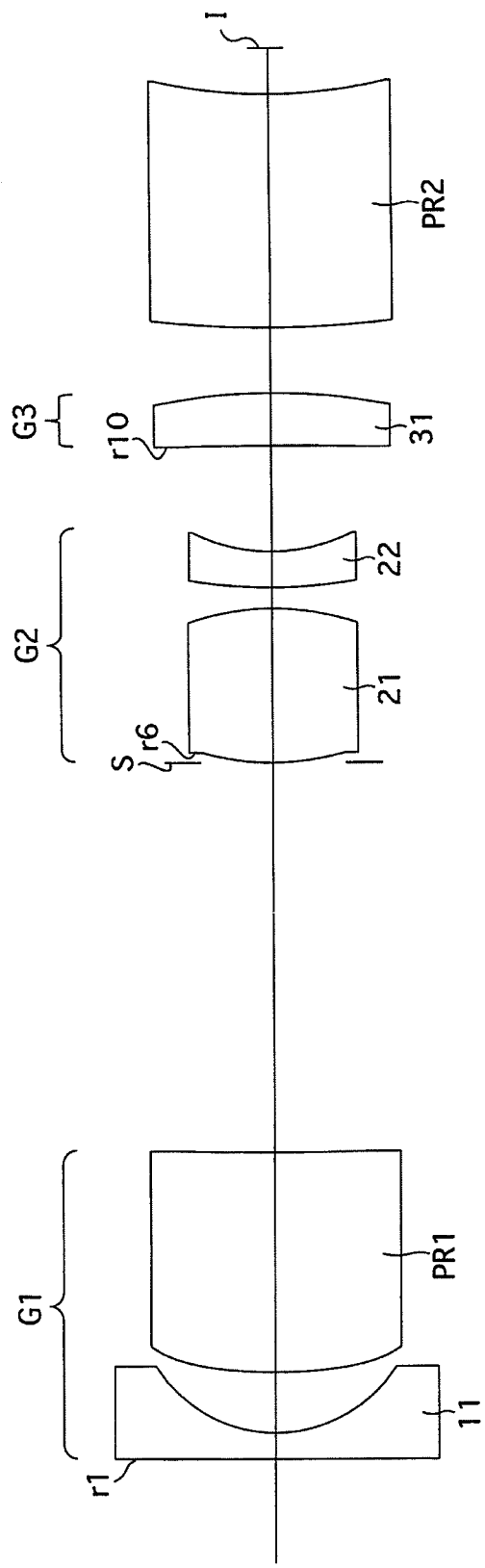
FIG. 29 shows a lens arrangement of the fifth numerical embodiment of the zoom lens system, according to the present invention, at the short focal length extremity when focused on an object at infinity.

FIGS. 25 through 30D and Tables 17 through 20 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIG. 27 shows a lens arrangement of the fifth numerical embodiment of the zoom lens system at an intermediate focal length when focussed on an object at infinity. FIGS. 28A, 28B, 28C and 28D show various aberrations that occurred in the lens arrangement shown in FIG. 27. FIG. 29 shows a lens arrangement of the fifth numerical embodiment of the zoom lens system at the short focal length extremity when focussed on an object at infinity. FIGS. 30A, 30B, 30C and 30D show various aberrations that occurred in the lens arrangement shown in FIG. 29. Table 17 shows the lens surface data, Table 18 shows various zoom lens system data, Table 19 shows the aspherical surface data, and Table 20 shows the lens group data of the zoom lens system according to the fifth numerical embodiment.

The fundamental lens arrangement of the fifth numerical embodiment is the same as that of the first numerical embodiment.

TABLE 17

SURFACE DATA

| Surf. No. | r | d | Nd | vd |
|---|---|---|---|---|
| 1 | −856.554 | 0.500 | 1.69680 | 55.5 |
| 2 | 2.730 | 1.168 | | |
| 3* | 10.312 | 4.185 | 1.63548 | 23.9 |
| 4* | 70.508 | d4 | | |
| 5(Diaphragm) | ∞ | 0.000 | | |
| 6* | 4.768 | 2.927 | 1.55332 | 71.7 |
| 7* | −4.932 | 0.400 | | |
| 8 | 9.711 | 0.679 | 1.60641 | 27.2 |
| 9 | 3.505 | d9 | | |
| 10* | ∞ | 0.998 | 1.54358 | 55.7 |
| 11* | −14.442 | d11 | | |
| 12 | 20.000 | 4.423 | 1.60641 | 27.2 |
| 13 | 10.000 | — | | |

The asterisk (*) designates an aspherical surface which is rotationally symmetrical with respect to the optical axis.

TABLE 18

ZOOM LENS SYSTEM DATA

Zoom Ratio 2.88

| | Short Focal Length Extremity | Intermediate Focal Length | Long Focal Length Extremity |
|---|---|---|---|
| FNO. | 3.5 | 4.6 | 5.8 |
| f | 3.00 | 5.05 | 8.65 |
| W | 43.8 | 26.4 | 15.3 |
| Y | 2.30 | 2.30 | 2.30 |
| fB | 1.00 | 1.00 | 1.00 |
| L | 26.89 | 26.89 | 26.89 |
| d4 | 7.372 | 3.731 | 0.330 |
| d9 | 1.990 | 5.708 | 1.170 |
| d11 | 1.252 | 1.176 | 9.115 |

TABLE 19

Aspherical Surface Data (the aspherical surface coefficients not indicated are zero (0.00)):

| Surf. No. | K | A4 | A6 | A8 | A10 |
|---|---|---|---|---|---|
| 3 | 0.000 | 0.2925E−02 | 0.4620E−03 | −0.4634E−04 | 0.1103E−04 |
| 4 | 0.000 | −0.7561E−03 | 0.9446E−04 | 0.5113E−04 | −0.1032E−04 |
| 6 | 0.000 | −0.3573E−02 | | | |
| 7 | 0.000 | 0.1447E−02 | | | |
| 10 | 0.000 | −0.4796E−02 | 0.9873E−03 | −0.3682E−04 | |
| 11 | 0.000 | −0.5094E−02 | 0.7086E−03 | −0.5571E−05 | |

TABLE 20

LENS GROUP DATA

| Lens Group | 1$^{st}$ Surf. | Focal Length |
|---|---|---|
| 1 (First lens group G1) | 1 | −5.21 |
| 2 (Second lens group G2) | 6 | 6.92 |
| 3 (Third lens group G3) | 10 | 26.57 |
| 4 (Reflection prism PR2) | 12 | −39.59 |

The numerical values of each condition for each embodiment are shown in Table 21.

TABLE 21

| | Embod. 1 | Embod. 2 | Embod. 3 | Embod. 4 | Embod. 5 |
|---|---|---|---|---|---|
| Cond. (1) | 27.2 | 27.2 | 31.2 | 27.2 | 27.2 |
| Cond. (2) | 5.4 | 4.2 | 5.0 | 2.6 | 6.7 |
| Cond. (3) | 4.2 | 3.3 | 3.7 | 2.1 | 3.3 |
| Cond. (4) | 23.9 | 23.9 | 23.9 | 23.9 | 23.9 |
| Cond. (5) | 1.4 | 1.2 | 1.3 | 1.3 | 1.2 |

As can be understood from Table 21, the first through fifth embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side, wherein upon zooming from the short focal length extremity to the long focal length extremity, the distance between said first lens group and said second lens group is decreased, and the distance between the second lens group and the third lens group is decreased, wherein a reflection prism having a negative refractive power is provided between said third lens group and the imaging plane, and wherein the following condition (1) is satisfied:

$$P2vd<32 \quad (1),$$

wherein

P2vd designates the Abbe number with respect to the d-line of said reflection prism provided between said third lens group and the imaging plane.

2. The zoom lens system according to claim 1, wherein said reflection prism, which is provided between said third lens group and the imaging plane, comprises a convex surface on the object side and a concave surface on the image side, wherein the following conditions (2) and (3) are satisfied:

$$2.5<P2R1/fw<6.8 \quad (2), \text{ and}$$

$$2.0<P2R2/fw<4.3 \quad (3),$$

wherein

P2R1 designates the radius of curvature of the surface on the object side of said reflection prism, which is provided between said third lens group and the imaging plane;

P2R2 designates the radius of curvature of the surface on the image side of said reflection prism, which is provided between said third lens group and the imaging plane; and fw designates the focal length of the entire zoom lens system at the short focal length extremity.

3. The zoom lens system according to claim 1, wherein said first lens group comprises a negative lens element, and a reflection prism having a positive refractive power and a convex surface on the object side thereof, in that order from the object side.

4. The zoom lens system according to claim 3, wherein the following condition (4) is satisfied:

$$P1vd<28 \quad (4),$$

wherein

P1vd designates the Abbe number with respect to the d-line of said reflection prism, which is provided within said first lens group.

5. The zoom lens system according to claim 1, wherein the following condition (5) is satisfied:

$$1.1<ft/f2<1.5 \quad (5),$$

wherein ft designates the focal length of the entire zoom lens system at the long focal length extremity; and f2 designates the focal length of said second lens group.

6. The zoom lens system according to claim 1, wherein said reflection prism, which is provided between said third lens group and the imaging plane, comprises an aspherical surface on at least one of the object side and the image side thereof.

7. The zoom lens system according to claim 3, wherein said reflection prism, which is provided within said first lens group, comprises an aspherical surface on at least one of the object side and the image side thereof.

* * * * *